(12) United States Patent
Miyanaga et al.

(10) Patent No.: US 7,450,666 B2
(45) Date of Patent: Nov. 11, 2008

(54) ASK DEMODULATION DEVICE AND WIRELESS DEVICE USING THE SAME

(75) Inventors: Kenji Miyanaga, Mino (JP); Tomohiro Kimura, Hirakata (JP); Kenichi Mori, Ibaraki (JP); Hitoshi Takai, Toyono-gun (JP)

(73) Assignee: Panasonic Corporation, Osaka (JP)

( * ) Notice: Subject to any disclaimer, the term of this patent is extended or adjusted under 35 U.S.C. 154(b) by 769 days.

(21) Appl. No.: 10/974,723

(22) Filed: Oct. 28, 2004

(65) Prior Publication Data

US 2005/0094745 A1   May 5, 2005

(30) Foreign Application Priority Data

Oct. 30, 2003   (JP)   ............... 2003-370376

(51) Int. Cl.
H04L 27/22 (2006.01)
H04L 7/04 (2006.01)
(52) U.S. Cl. ................... 375/333; 375/320; 375/361
(58) Field of Classification Search ............ 375/268, 375/300, 320, 359, 361, 286, 287, 293, 295, 375/316, 333, 340; 332/149; 341/68, 69, 341/70, 40; 329/347
See application file for complete search history.

(56) References Cited

U.S. PATENT DOCUMENTS 4,292,626 A * 9/1981 Smithlin ................. 341/70
4,350,973 A     9/1982 Petryk, Jr.
4,363,002 A * 12/1982 Fuller ..................... 375/333
5,164,966 A * 11/1992 Hershberger ............. 375/359
5,946,355 A * 8/1999 Baker .................... 375/286

FOREIGN PATENT DOCUMENTS

| EP | 0 829 978 | 3/1998 |
| JP | 359075741 A * | 4/1984 |
| JP | 404054751 A * | 2/1992 |
| JP | 2000-078211 | 3/2000 |
| JP | 2001-211214 | 8/2001 |
| JP | 2004-158960 | 6/2004 |

* cited by examiner

Primary Examiner—Betsy L Deppe
(74) Attorney, Agent, or Firm—Wenderoth, Lind & Ponack, L.L.P.

(57) ABSTRACT

A delay section delays a detected signal by less than one bit time in the NRZ data. A subtraction section performs subtraction between a delayed signal and the detected signal, and outputs a resultant signal. A clock extraction section extracts, from crossing points of a subtracted signal, crossing points whose time interval is more than or equal to $(Tb-\alpha)$ and less than or equal to $(Tb+\beta)$ (wherein $0<\alpha \leq Tb/8$, $0<\beta \leq Tb$: Tb is one bit time in the NRZ data), and outputs a synchronous signal synchronized with the extracted crossing point. A clock recovery section synchronizes a clock signal with the phase of the synchronous signal, and outputs a data clock signal. A determination section determines the polarity of the subtracted signal outputted from the subtraction section in accordance with the data clock signal, and outputs the determination result as the NRZ data.

18 Claims, 19 Drawing Sheets

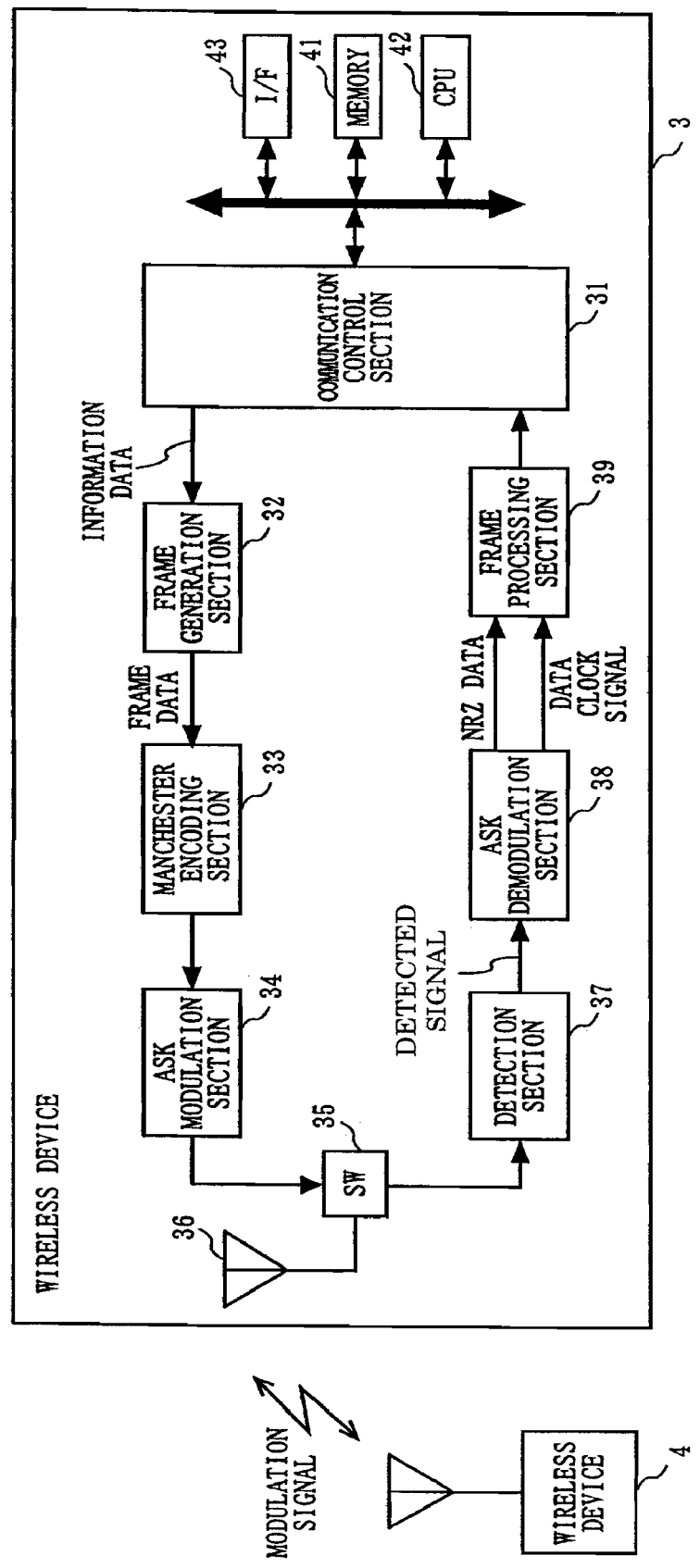
F I G. 1 9

ASK DEMODULATION DEVICE AND WIRELESS DEVICE USING THE SAME

BACKGROUND OF THE INVENTION

1. Field of the Invention

The present invention relates to a demodulation device for demodulating a signal modulated with a data sequence encoded by using a predetermined scheme and a wireless device using the same demodulation device. More particularly, the present invention relates to an ASK (Amplitude Shift Keying) demodulation device for demodulating a signal (hereinafter referred to as a modulated signal) obtained by modulating a carrier which is ASK-modulated with a data sequence (Manchester data) obtained by Manchester-encoding NRZ (Non-Return to Zero) data, and a wireless device using the ASK demodulation device.

2. Description of the Background Art

Manchester encoding is a scheme of encoding data in which NRZ data "0" is mapped to "01" and NRZ data "1" is mapped to "10". As such, in Manchester encoding, one bit is translated into a two-bit Code. Thus, there is always a level transition in the middle of each bit time of Manchester code. Note that, in Manchester encoding, NRZ data "0" may be mapped to "10" and NRZ data "1" may be mapped to "01". However, in the following description, the former mapping rule in which NRZ data "0" is mapped to "01" and NRZ data "1" is mapped to "10" will be used. It will be understood that the latter mapping rule can also be used in the present invention.

An operation of a conventional ASK demodulation device for demodulating a modulated signal which is ASK-modulated with a Manchester-encoded data sequence will be briefly described. First, the conventional ASK demodulation device detects a modulated signal which is ASK-modulated with a Manchester-encoded data sequence by using a method such as synchronous detection or asynchronous detection (envelope detection), and obtains a detected signal. Next, the conventional ASK demodulation device compares the detected signal with a reference threshold value for determining which is greater, and obtains Manchester data which is a Manchester-encoded data sequence. Finally, the conventional ASK demodulation device performs Manchester decoding for the Manchester data, and outputs NRZ data, which is an NRZ-encoded data sequence, and a data clock signal which is a clock signal synchronized with the NRZ data. That is, other than Manchester decoding, the conventional demodulation device performs the same process as performed for demodulating a modulated signal which is ASK-modulated with an NRZ-encoded data sequence.

In general, a mean value of the detected signal is used as a threshold value for demodulating a modulated signal which is ASK-modulated with an encoded data sequence irrespective of whether the data sequence is encoded by NRZ encoding or Manchester encoding.

Also, Japanese Laid-Open Patent Publication No. 2000-78211 (patent document 1) discloses a technique in which a mean value of a maximum value and a minimum value of the detected signal is used as a threshold value for performing high-quality demodulation of ASK-modulated NRZ code.

In the case where a modulated signal which is ASK-modulated with an NRZ-encoded data sequence is demodulated, it is impossible for the conventional ASK demodulation device to calculate a correct threshold value if "0" or "1" is continuously inputted during a time period in which a mean value of the detected signal is obtained or a time period in which a mean value of a maximum value and a minimum value of the detected signal is obtained. Thus, the time period for obtaining a mean value has to be sufficiently longer than the bit time. However, too long time period for obtaining a mean value slows a response. As a result, in the case where a modulated signal which is ASK-modulated with an NRZ-encoded data sequence is demodulated, it is not impossible for the conventional ASK demodulation device to quickly change the threshold value in accordance with a level change of the detected signal.

On the other hand, in the case where a modulated signal which is ASK-modulated with a Manchester-encoded data sequence is demodulated, "0" and "1" are always included in one bit time. Thus, a conventional ASK demodulation device does not need to set a long time period for obtaining a mean value, compared to the case in which a modulated signal which is ASK-modulated with an NRZ-encoded data sequence is demodulated. As a result, it is easy for the conventional ASK demodulation device to change the threshold value in accordance with a level change of the detected signal.

FIG. 28 is a block diagram showing a structure of a conventional ASK demodulation device 90 disclosed in patent document 1. In FIG. 28, the conventional ASK demodulation device 90 includes an extreme value detection section 91, a moving average section 92, an averaging section 93, and a binarization calculating section 94. Hereinafter, an operation of the conventional ASK demodulation device when a modulated signal which is ASK-modulated with a Manchester-encoded data sequence is demodulated will be described. A detected signal obtained by detecting a modulated signal which is ASK-modulated with a Manchester-encoded data sequence by using a method such as synchronous detection or asynchronous detection is inputted to the ASK demodulation device 90. A threshold value used for comparison with the detected signal is calculated by the extreme value detection section 91, the moving average section 92, and the averaging section 93. The extreme value detection section 91 detects a maximum value and a minimum value of the inputted detected signal during a plurality of predetermined time periods, and inputs the detected values to the moving average section 92. The moving average section 92 obtains an average value of a plurality of minimum values in the plurality of predetermined time periods and an average value of a plurality of maximum values in the plurality of predetermined time periods, and inputs the resultant values, which are moving averages, to the averaging section 93. The averaging section 93 calculates an average value based on the moving average of the maximum values and the moving average of the minimum values, which are inputted from the moving average section 92, and inputs the resultant value to the binarization calculating section 94. The binarization calculating section 94 compares the detected signal with a threshold value outputted from the averaging section 93 for determining which is greater, and outputs Manchester data which is a Manchester-encoded data sequence. The Manchester data is a binary signal having "0" or "1", and is inputted to a following Manchester decoding section (not shown). The Manchester decoding section performs clock recovery by detecting a change point of the Manchester data, and decodes Manchester code, thereby outputting NRZ data, which is an NRZ-encoded data sequence, and a data clock signal, which is a clock signal synchronized with the NRZ data. As such, the detected signal is demodulated.

Also, Japanese Laid-Open Patent Publication No. 2001-211214 (patent document 2) discloses a method of improving the duty ratio of Manchester data independent of the waveform of a detected signal. In this method, a threshold value is controlled based on Manchester data, and the controlled threshold value and the detected signal are compared for determining which is greater, thereby obtaining Manchester data. That is, a feedback loop is generated between a circuit for controlling a threshold value based on Manchester data and a circuit for comparing the threshold value with the detected signal for determining which is greater, whereby the threshold value is converged. As a result, the duty ratio is improved.

FIG. 29A is an illustration showing an eye pattern of a detected signal in the conventional ASK demodulation device 90 as shown in FIG. 28. FIG. 29B is an illustration showing an eye pattern of Manchester data in the conventional ASK demodulation device 90 as shown in FIG. 28. FIG. 29C is an illustration showing an eye pattern of Manchester data whose duty ratio is 50%. Hereinafter, with reference to FIGS. 29A, 29B, and 29C, the drawbacks of the conventional demodulation device 90 as shown in FIG. 28 will be described.

For instance, assume that a detected signal having an eye pattern as illustrated in FIG. 29A is inputted to the conventional ASK demodulation device. The horizontal axis represents time normalized by the bit time. The vertical axis represents signal amplitude. It is evident that the detected signal as shown in FIG. 29A is distorted and asymmetrical in that its upper portion is different from its lower portion in shape. In the case where a threshold value is obtained by the ASK demodulation device 90 as shown in FIG. 28, an average value of the maximum value and the minimum value of the detected signal is used as the threshold value. Thus, a value indicated by a dotted line in FIG. 29A is used as the threshold value. As a result, as illustrated in FIG. 29B, Manchester data with high jitter is obtained. Ideally, as illustrated in FIG. 29C, it is desirable to obtain Manchester data with 50% duty ratio. Here, the duty ratio is the ratio of a high-level period of the Manchester data to one bit time in the NRZ data. As illustrated in FIG. 29B, if the duty ratio of the Manchester data is not 50%, clock recovery is not stable in the Manchester decoding section. Thus, bit errors often occur when Manchester code is decoded. Similarly, even if the method using an average value of the detected signal as a threshold value is utilized, the duty ratio of the Manchester data may not be 50% when the detected signal is distorted.

Also, the method as disclosed in patent document 2 has the following drawback. In general, the feedback loop contains a trade off between changeability in a threshold value and loop stability to disturbance such as noise. Thus, the method as disclosed in patent document 2 has limitations in changing the threshold value quickly enough to deal with a case where a packet is received or the level of the detected signal is varied, for example. In order to concurrently achieve changeability and stability of a threshold value, the method as disclosed in patent document 2 additionally requires a complicated control circuit and fine adjustment thereof.

As such, the conventional ASK demodulation device adopting the method of comparing a detected signal with a threshold value for determining which is greater has the drawback that it is impossible to obtain the Manchester data with 50% duty ratio if the detected signal is distorted. Also, the conventional ASK demodulation device adopting the method of comparing a detected signal with a threshold value for determining which is greater has the drawback that a complicated control circuit for controlling the threshold value and fine adjustment of the control circuit are required to obtain the Manchester data with 50% duty ratio.

SUMMARY OF THE INVENTION

Therefore, an object of the present invention is to provide an ASK demodulation device which demodulates a modulated signal which is ASK-modulated with a Manchester-encoded data sequence and requires no calculation and control of a threshold value based on a detected signal, and a wireless device using the ASK demodulation device.

The present invention has the following features to attain the object mentioned above. The present invention is directed to an ASK demodulation device for demodulating a modulated signal which is ASK-modulated with a data sequence obtained by Manchester-encoding NRZ data. The ASK demodulation device comprises a delay section for delaying a detected signal obtained by detecting the modulated signal by less than one bit time in the NRZ data, and outputting the resultant signal as a delayed signal; a subtraction section for performing subtraction between the delayed signal outputted from the delay section and the detected signal, and outputting the resultant signal as a subtracted signal; a clock extraction section for extracting, from crossing points at which the subtracted signal outputted from the subtraction section and a threshold value cross each other, crossing points whose time interval is more than or equal to Tb−α and less than or equal to Tb+β (0<α≦Tb/8, 0<β≦Tb: Tb is one bit time in the NRZ data), and outputting a synchronous signal synchronized with the extracted crossing point; a clock recovery section for synchronizing a clock signal having the same rate as a bit rate of the NRZ data with the phase of the synchronous signal outputted from the clock extraction section, and outputting a data clock signal; and a determination section for determining the polarity of the subtracted signal outputted from the subtraction section in accordance with the data clock signal outputted from the clock recovery section, and outputting a determination result as NRZ data.

Preferably, the delay section may delay the detected signal by more than or equal to 3/24 bit time and less than or equal to 0.5 bit time, and output the resultant signal as the delayed signal.

Preferably, the delay section may delay the detected signal by more than or equal to 0.5 bit time and less than or equal to 21/24 bit time, and output the resultant signal as the delayed signal.

Preferably, the delay section may delay the detected signal by 0.5 bit time, and output the resultant signal as the delayed signal.

Preferably, the clock extraction section may extract, from the crossing points of the subtracted signal outputted from the subtraction section, crossing points whose time interval is Tb, and output a synchronous signal synchronized with the extracted crossing point.

Preferably, the ASK demodulation device may comprise a low-pass filter connected to a previous or following stage of a data extraction section, which is structured by the delay section and the subtraction section, to remove a high frequency component included in an input signal.

Preferably, the low-pass filter may be an integration filter for integrating the input signal for a predetermined time period.

Preferably, an integration period of the integration filter may be less than one bit time.

Preferably, an integration period of the integration filter may be 0.5 bit time.

The present invention is also directed to a wireless device for transmitting and receiving a modulated signal which is ASK-modulated with a data sequence obtained by Manchester-encoding NRZ data. The wireless device comprises: a frame generation section for generating frame data by structuring information data to be transmitted, which is NRZ data, as a frame; a Manchester encoding section for Manchester-encoding the frame data generated by the frame generation section, and outputting resultant data as Manchester data; an ASK modulation section for ASK-modulating a carrier by the Manchester data outputted from the Manchester encoding section, and outputting the modulated signal; a detection section for detecting the modulated signal transmitted from another wireless device, and outputting a detected signal; an ASK demodulation section for demodulating the detected signal outputted from the detection section, and outputting NRZ data and a data clock signal; and a frame processing section for extracting the information data based on the NRZ data and the data clock signal outputted from the ASK demodulation section, and outputting the information data. The frame generation section generates the frame data so that at least one or more NRZ data patterns "101" or "010" are included therein. The ASK demodulation section includes: a delay section for delaying the detected signal outputted from the detection section by less than one bit time in NRZ data, and outputting the resultant signal as a delayed signal; a subtraction section for performing subtraction between the delayed signal outputted from the delay section and the detected signal, and outputting the resultant signal as a subtracted signal; a clock extraction section for extracting, from crossing points at which the subtracted signal outputted from the subtraction section and a threshold value cross each other, crossing points whose time interval is more than or equal to Tb−α and less than or equal to Tb+β ($0<\alpha \leqq Tb/8$, $0<\beta \leqq Tb$: Tb is one bit time in the NRZ data), and outputting a synchronous signal synchronized with the extracted crossing point; a clock recovery section for synchronizing a clock signal having the same rate as a bit rate of the NRZ data with the phase of the synchronous signal outputted from the clock extraction section, and outputting the resultant signal as a data clock signal; and a determination section for determining the polarity of the subtracted signal outputted from the subtraction section in accordance with the data clock signal outputted from the clock recovery section, and outputting a determination result as NRZ data.

Preferably, the frame generation section may generate the frame data so that at least one or more NRZ data patterns "101" or "010" are included in a head of the frame data.

Preferably, the frame generation section may divide the information data into a plurality of blocks, and generate the frame data so that at least one or more NRZ data patterns "101" or "010" are included between the adjacent blocks.

Preferably, the frame generation section may divide the information data into a plurality of blocks. When the last bit of the block is "1", the frame generation section may insert an NRZ data pattern beginning from "01" immediately after the block in order to generate the frame data. On the other hand, when the last bit of the block is "0", the frame generation section may insert an NRZ data pattern beginning from "10" immediately after the block in order to generate the frame data.

Preferably, the frame generation section may divide the information data into a plurality of blocks. When the first bit of the block is "1", the frame generation section may insert an NRZ data pattern ending with "10" immediately before the block in order to generate the frame data. On the other hand, when the first bit of the block is "0", the frame generation section may insert an NRZ data pattern ending with "01" immediately before the block in order to generate the frame data.

Preferably, the clock extraction section may extract the crossing points only when a pattern "101" or "010" previously inserted into the frame data is received.

The present invention is also directed to a transmitting device for transmitting a modulated signal which is ASK-modulated with a data sequence obtained by Manchester-encoding NRZ data. The transmitting device comprises: a frame generation section for generating frame data by structuring information data to be transmitted, which is NRZ data, as a frame; a Manchester encoding section for Manchester-encoding the frame data generated by the frame generation section, and outputting resultant data as Manchester data; and an ASK modulation section for ASK-modulating a carrier by the Manchester data outputted from the Manchester encoding section, and outputting the modulated signal. The frame generation section generates the frame data so that at least one or more NRZ data patterns "101" or "010" are included therein.

The present invention is also directed to a receiving device for receiving a modulated signal which is ASK-modulated with a data sequence obtained by Manchester-encoding NRZ data including at least one or more patterns "101" or "010". The receiving device comprises: a detection section for detecting the modulated signal transmitted from another wireless device, and outputting a detected signal; an ASK demodulation section for demodulating the detected signal outputted from the detection section, and outputting NRZ data and a data clock signal; and a frame processing section for extracting information data based on the NRZ data and the data clock signal outputted from the ASK demodulation section, and outputting the information data. The ASK demodulation section includes: a delay section for delaying the detected signal outputted from the detection section by less than one bit time in NRZ data, and outputting the resultant signal as a delayed signal; a subtraction section for performing subtraction between the delayed signal outputted from the delay section and the detected signal, and outputting the resultant signal as a subtracted signal; a clock extraction section for extracting, from crossing points at which the subtracted signal outputted from the subtraction section and a threshold value cross each other, crossing points whose time interval is more than or equal to Tb−α and less than or equal to Tb+β ($0<\alpha \leqq Tb/8$, $0<\beta \leqq Tb$: Tb is one bit time in the NRZ data), and outputting a synchronous signal synchronized with the extracted crossing point; a clock recovery section for synchronizing a clock signal having the same rate as a bit rate of the NRZ data with the phase of the synchronous signal outputted from the clock extraction section, and outputting a data clock signal; and a determination section for determining the polarity of the subtracted signal outputted from the subtraction section in accordance with the data clock signal outputted from the clock recovery section, and outputting a determination result as NRZ data.

The present invention is also directed to an integration circuit for demodulating a modulated signal which is ASK-modulated with a data sequence obtained by Manchester-encoding NRZ data. The integration circuit comprises: a delay section for delaying a detected signal obtained by detecting the modulated signal by less than one bit time in NRZ data, and outputting the resultant signal as a delayed signal; a subtraction section for performing subtraction between the delayed signal outputted from the delay section and the detected signal, and outputting the resultant signal as a subtracted signal; a clock extraction section for extracting, from crossing points at which the subtracted signal outputted from the subtraction section and a threshold value cross each other, crossing points whose time interval is more than or equal to Tb−α and less than or equal to Tb+β ($0<\alpha \leqq Tb/8$, $0<\beta\leq Tb$: Tb is one bit time in the NRZ data), and outputting a synchronous signal synchronized with the extracted crossing point; a clock recovery section for synchronizing a clock signal having the same rate as a bit rate of the NRZ data with the phase of the synchronous signal outputted from the clock extraction section, and outputting a data clock signal; and a determination section for determining the polarity of the subtracted signal outputted from the subtraction section in accordance with the data clock signal outputted from the clock recovery section, and outputting a determination result as NRZ data.

The present invention is also directed to an integration circuit for transmitting and receiving a modulated signal which is ASK-modulated with a data sequence obtained by Manchester-encoding NRZ data. The integration circuit comprises: a frame generation section for generating frame data by structuring information data to be transmitted, which is NRZ data, as a frame; a Manchester encoding section for Manchester-encoding the frame data generated by the frame generation section, and outputting resultant data as Manchester data; an ASK modulation section for ASK-modulating a carrier by the Manchester data outputted from the Manchester encoding section, and outputting a modulated signal; a detection section for detecting the modulated signal transmitted from another wireless device, and outputting a detected signal; an ASK demodulation section for demodulating the detected signal outputted from the detection section, and outputting NRZ data and a data clock signal; and a frame processing section for extracting the information data based on the NRZ data and the data clock signal outputted from the ASK demodulation section, and outputting the information data. The frame generation section generates the frame data so that at least one or more NRZ data patterns "101" or "010" are included therein. The ASK demodulation section includes: a delay section for delaying the detected signal outputted from the detection section by less than one bit time in NRZ data, and outputting the resultant signal as a delayed signal; a subtraction section for performing subtraction between the delayed signal outputted from the delay section and the detected signal, and out putting the resultant signal as a subtracted signal; a clock extraction section for extracting, from crossing points at which the subtracted signal outputted from the subtraction section and a threshold value cross each other, crossing points whose time interval is more than or equal to Tb–α and less than or equal to Tb+β $(0<\alpha\leq Tb/8$, $0<\beta\leq Tb$: Tb is one bit time in the NRZ data), and outputting a synchronous signal synchronized with the extracted crossing point; a clock recovery section for synchronizing a clock signal having the same rate as a bit rate of the NRZ data with the phase of the synchronous signal outputted from the clock extraction section, and outputting a data clock signal; and a determination section for determining the polarity of the subtracted signal outputted from the subtraction section in accordance with the data clock signal outputted from the clock recovery section, and outputting a determination result as NRZ data.

Hereinafter, the effect of the present invention will be described. According to the present invention, the phase of a data clock signal is adjusted based on a crossing point of a subtracted signal obtained by performing subtraction between a detected signal and a delayed signal delayed by less than one bit time, the polarity of the subtracted signal is determined based on the phase-adjusted data clock signal, and NRZ data is outputted. Thus, it is possible to provide an ASK demodulation device requiring no calculation and control of a threshold value in accordance with the detected signal, and a wireless device using the ASK demodulation.

Also, even if the detected signal is distorted, the amplitude value relation between the first- and last bit signal does not change. Thus, any special threshold value control is not required. Furthermore, a signal and a data clock signal used for polarity determination can be obtained by a simple configuration consisting of the delay section and the subtraction section. Thus, it is not necessary to use a complicated control circuit requiring fine adjustment. Especially, in the present invention, the same signal is utilized as a subtracted signal for polarity determination and phase adjustment of a data clock signal, whereby demodulation of NRZ data and recovery of a data clock signal is performed by a very simple configuration. Also, by providing margins α and β for a time interval at which a crossing point is detected, it is possible to recover a data clock signal even if jitter occurs during the time interval between the crossing points. The value of α which is greater than Tb/8 will increase the possibility that 3Tb/4 will be detected as a crossing point interval by mistake. Thus, in order to recover a correct data clock signal, it is preferable that the value of α be equal to or smaller than Tb/8. Also, the crossing point interval never exceeds 2Tb, whereby it is preferable that the value of β be equal to or smaller than Tb.

By setting the delay amount to more than or equal to $3/24$ bit time and less than or equal to 0.5 bit time, or more than or equal to 0.5 bit time and less than or equal to $21/24$ bit time, it can be expected that NRZ data will be demodulated in an accurate manner. Also, by setting the delay amount to more than or equal to 0.5 bit time and less than or equal to $21/24$ bit time, the clock extraction section can detect the crossing point with ease. When the delay amount is 0.5 bit time, it is possible to demodulate NRZ data in the most accurate manner.

The clock extraction section extracts the crossing points whose time interval is Tb, whereby it is possible to obtain an optimal data clock signal used for determining the polarity of the subtracted signal.

Also, it is possible to remove a high frequency component by connecting the low-pass filter to a previous or following stage of the data extraction section. As a result, it is possible to increase SNR and provide excellent bit error rate characteristics.

By using the integration filter as a low-pass filter and setting the integration period to less than one bit time, it is possible to prevent an NRZ data component from being removed. As a result, it is possible to obtain more excellent bit error rate characteristics. By setting the integration period to 0.5 bit time, a correlation receiver for obtaining a correlation between a detected signal and a rectangular signal can be structured by the data extraction section and the integration filter. As a result, bit error rate characteristics are improved. Also, the clock extraction section is less subject to noise at the time of detection of crossing points.

Furthermore, by generating a frame data so that a pattern "101" or "010" is included therein, it is possible to demodulate the information data correctly. In the case where the above pattern is included in a head of the frame, the phase of the data clock signal is adjusted in a preamble, whereby the information data following a unique word can be correctly demodulated. On the other hand, in the case where the above pattern is included in the information data, it is possible to adjust the phase of the data clock signal during the reception of the information data. Also, by determining a minimum pattern to be inserted in accordance with the last or first bit of the divided information data, it is possible to improve transmission efficiency.

Also, by forcing the clock extraction section to detect the crossing points only when the pattern "101" or "010" is intentionally inserted, it is possible to prevent clock recovery from being performed by mistake while the above pattern is not received. As a result, it is possible to minimize the number of bit errors.

These and other objects, features, aspects and advantages of the present invention will become more apparent from the following detailed description of the present invention when taken in conjunction with the accompanying drawings.

BRIEF DESCRIPTION OF THE DRAWINGS

FIG. 19 is a block diagram showing a structure of a wireless system and a wireless device 3 according to a third embodiment of the present invention;

FIG. 25 is a block diagram showing a structure of an ASK demodulation section 38a;

DESCRIPTION OF THE PREFERRED EMBODIMENTS

Hereinafter, with reference to the drawings, embodiments of the present invention will be described.

First Embodiment

Figure 1:
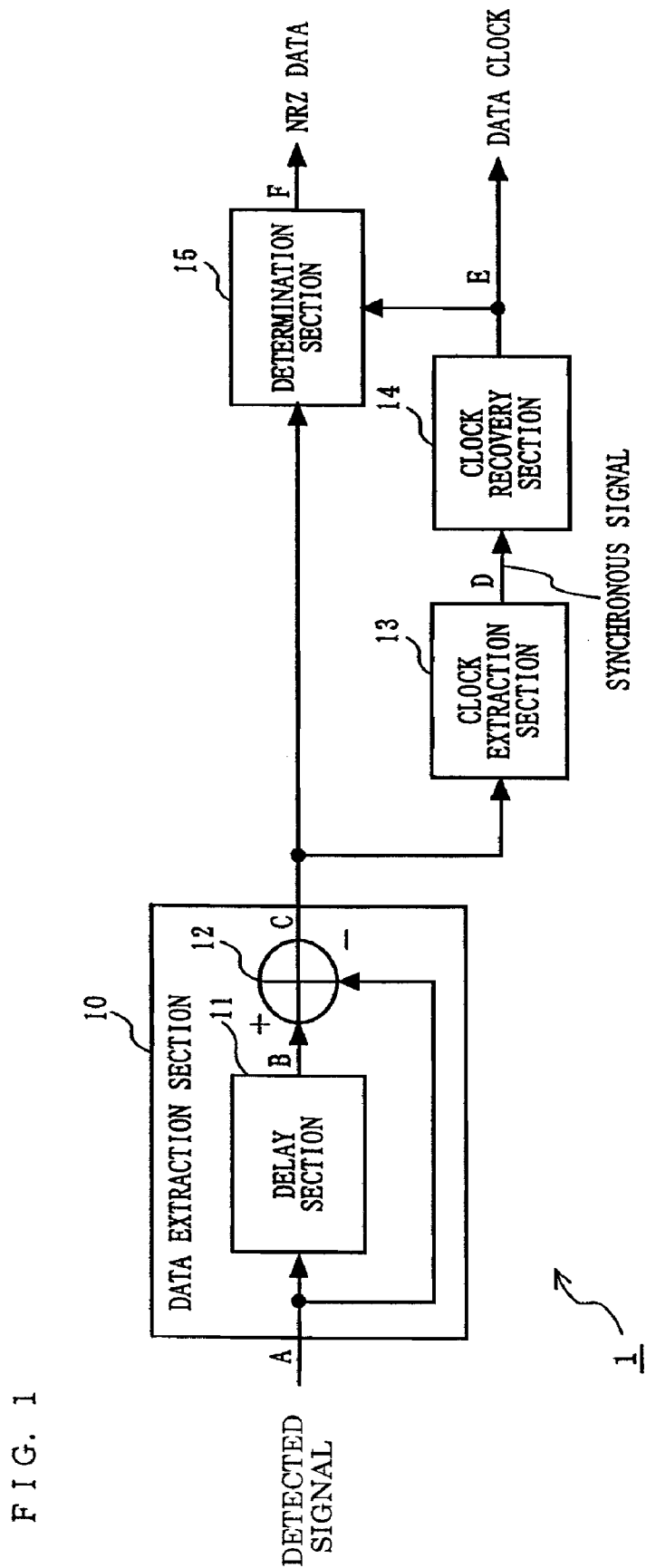
FIG. 1 is a block diagram illustrating a structure of an ASK demodulation device 1 according to a first embodiment of the present invention.

FIG. 1 is a block diagram illustrating a structure of an ASK demodulation device 1 according to a first embodiment of the present invention. In FIG. 1, the ASK demodulation device 1 includes a data extraction section 10, a clock extraction section 13, a clock recovery section 14, and a determination section 15. The data extraction section 10 includes a delay section 11 and a subtraction section 12.

A detection section (not shown) detects a modulated signal which is ASK-modulated with a Manchester-encoded data sequence (Manchester data) by using a method such as synchronous detection or asynchronous detection, and inputs the detected signal to the data extraction section 10.

The data extraction section 10 outputs a signal including information (hereinafter referred to as an NRZ data component) about pre-Manchester-encoded NRZ data.

The clock extraction section 13 extracts, from the output signal of the data extraction section 10, a component (hereinafter referred to as a clock component) having the same rate as the bit rate, and outputs the extracted component as a synchronous signal.

The operations of the data extraction section 10 and the clock extraction section 13 will be described in detail below.

The clock recovery section 14 synchronizes the phase of the clock signal having the same rate as the bit rate with the phase of the synchronous signal, and outputs a data clock signal. A PLL (Phase Lock Loop) circuit, for example, may be utilized as the clock recovery section 14

The determination section 15 determines the polarity of the output signal of the data extraction section 10 based on the data clock signal recovered by the clock recovery section 14, and outputs NRZ data, which is an NRZ-encoded data sequence.

The operation of the data extraction section 10 will be described. The data extraction section 10 performs subtraction between the amplitude value of a signal obtained by delaying the detected signal by 0.5 bit time and the amplitude value of the detected signal, and outputs the result. Here, one bit time is a time corresponding to one bit of NRZ data, and is represented as a reciprocal of the bit rate. The detected signal inputted to the data extraction section 10 is inputted to the delay section 11 and the subtraction section 12. The delay section 11 delays the detected signal by 0.5 bit time, and outputs the delayed signal. The subtraction section 12 outputs the result obtained by subtracting the amplitude of the detected signal from the amplitude of the delayed signal. As such, the data extraction section 10 performs subtraction between the amplitude value of a signal obtained by delaying the detected signal by 0.5 bit time and the amplitude value of the detected signal, where by the data extraction section 10 is able to output a signal including the NRZ data component from the detected signal for the following reasons.

When NRZ data is Manchester encoded, the symbol "0" (hereinafter referred to as "0") of NRZ data is mapped to "01" and the symbol "1" (hereinafter referred to as "1") of NRZ data is mapped to "10". When Manchester data, which is a Manchester-encoded data sequence, is decoded to recover the NRZ data, the amplitude value of the first-half bit signal is compared with the amplitude of the last-half bit signal for determining which is greater. Based on the comparison result, it is determined whether the Manchester data is "01" or "10", and whether the NRZ data is "0" or "1". The data extraction section 10 subtracts the amplitude of the detected signal from the amplitude of a signal obtained by delaying the detected signal by 0.5 bit time, which is a time lag between the first-half bit and the last-half bit, and outputs the subtraction result. Thus, the output signal of the data extraction section 10 includes the result obtained by comparing the first-half bit with the last-half bit of the detected signal as an NRZ data component. Therefore, NRZ data is obtained by determining the polarity of the output signal of the data extraction section 10 based on the data clock signal.

Next, the operation of the clock extraction section 13 will be described. The clock extraction section 13 extracts a clock component having the same rate as the bit rate from the output signal of the data extraction section 10. Specifically, the clock extraction section 13 detects whether or not a time interval between zero-crossing points of the output signal outputted from the data extraction section 10 is equal to one bit time in NRZ data. If the time interval is equal to one bit time, the clock extraction section 13 outputs a synchronous signal synchronized with the zero-crossing point. Here, a zero-crossing point is a time point at which the polarity of the signal is reversed, that is, a time point at which the signal passes through a level whose amplitude value is zero. As such, the clock extraction section 13 detects that the zero-crossing time interval is equal to one bit time and outputs a synchronous signal, whereby the clock recovery section 14 can recover an accurate data clock signal by synchronizing a data clock signal to the synchronous signal.

Figure 2:
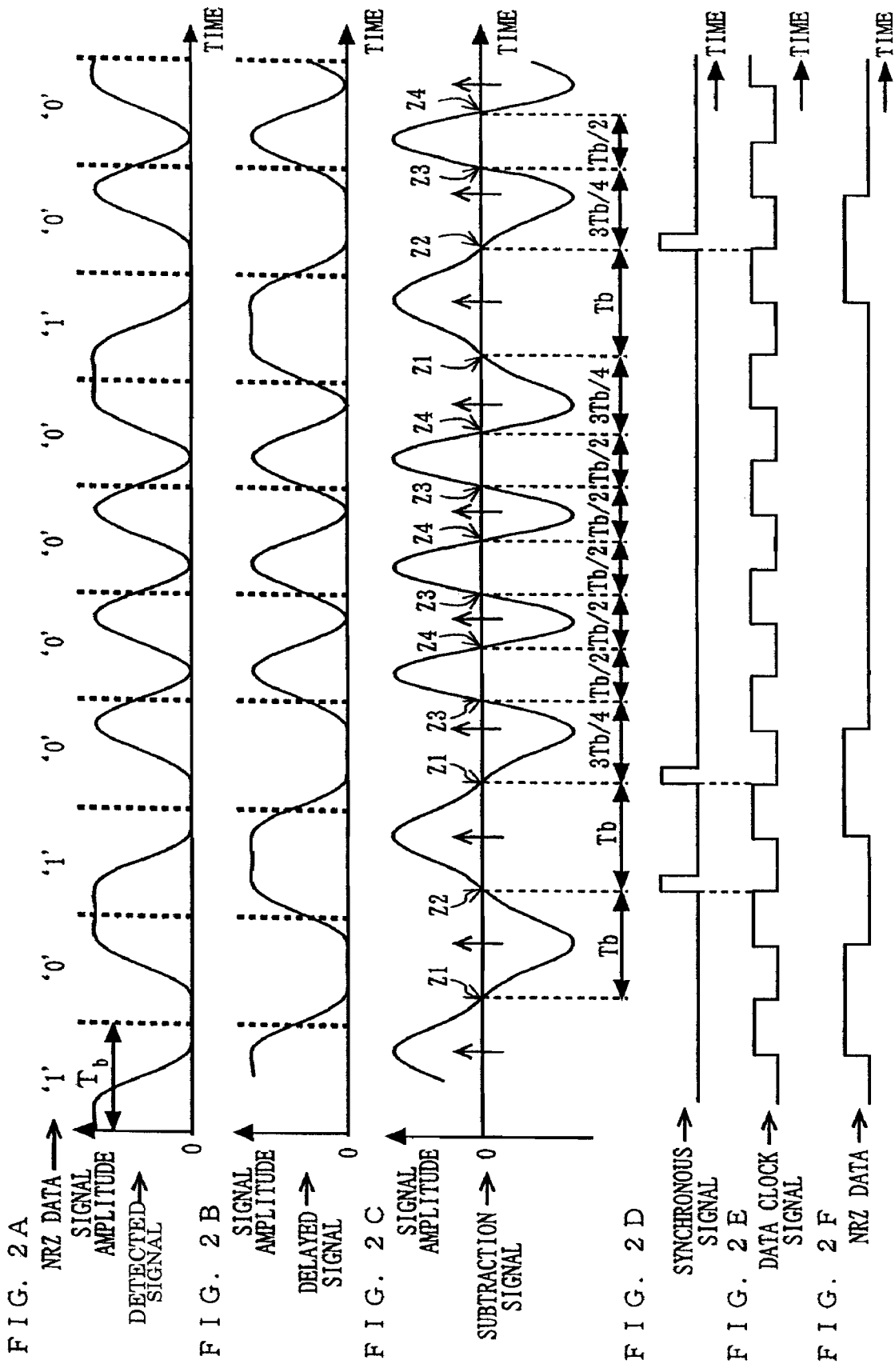
FIG. 2A is an illustration showing an amplitude waveform of a detected signal corresponding to NRZ data.
FIG. 2B is an illustration showing an amplitude waveform of a detected signal (delayed signal) which is delayed by 0.5 bit time and is outputted from a delay section 11.
FIG. 2C is an illustration showing a waveform of a signal which is obtained by subtracting an amplitude value of a pre-delayed detected signal from an amplitude value of a delayed detected signal (delayed signal) and is outputted from a subtraction section 12.
FIG. 2D is an illustration showing a synchronous signal outputted from a clock extraction section 13.
FIG. 2E is an illustration showing a data clock signal outputted from a clock recovery section 14.
FIG. 2F is an illustration showing NRZ data outputted from a determination section 15.

FIG. 2A is an illustration showing an amplitude waveform of a detected signal corresponding to NRZ data. FIG. 2B is an illustration showing an amplitude waveform of a detected signal (delayed signal) which is delayed by 0.5 bit time and is outputted from the delay section 11. FIG. 2C is an illustration showing a waveform of a signal which is obtained by subtracting an amplitude value of a pre-delayed detected signal from an amplitude value of a delayed detected signal (delayed signal) and is outputted from the subtraction section 12. FIG. 2D is an illustration showing a synchronous signal outputted from the clock extraction section 13. FIG. 2E is an illustration showing a data clock signal outputted from the clock recovery section 14. FIG. 2F is an illustration showing NRZ data outputted from the determination section 15. Hereinafter, with reference to FIGS. 2A, 2B, 2C, 2D, 2E, and 2F, the operation of the ASK demodulation device will be described in detail. Note that, A, B, C, D, E, and F described in FIG. 1 correspond to FIGS. 2A, 2B, 2C, 2D, 2E, and 2F, respectively.

The delay section 11 outputs the delayed signal (see FIG. 2B) obtained by delaying the detected signal (see FIG. 2A) by 0.5 bit time. The subtraction section 12 outputs a signal (hereinafter referred to as a subtracted signal; see FIG. 2C) obtained by subtracting the amplitude value of the detected signal (see FIG. 2A) from the amplitude value of the delayed signal (see FIG. 2B).

Here, the polarity of the subtracted signal as shown in FIG. 2C will be studied. It is evident that the polarity at a time point indicated by an arrow in FIG. 2C corresponds to the NRZ data as shown in FIG. 2A. Judging from these drawings, if the polarity at the above time point is positive, it is evident that NRZ data corresponding to Manchester code "10" is "1". This is because the above polarity represents a value obtained as a result of subtracting "0", which is the last half of Manchester code, from "1", which is the first half of Manchester code. On the other hand, if the polarity at the above time point is negative, it is evident that NRZ data corresponding to Manchester code "01" is "0". This is because the above polarity represents a value obtained as a result of subtracting "1", which is the last half of Manchester code, from "0", which is the first half of Manchester code. As such, the subtracted signal outputted from the data extraction section 10 provides information (an NRZ data component) about the transmitted NRZ data as the polarity at a predetermined time point.

Next, a zero-crossing point of the subtracted signal as shown in FIG. 2C will be studied. In the case where the NRZ data is changed from "1" to "0", "0", which is the first half of Manchester code "01" corresponding to the NRZ data "0", is subtracted from "0", which is the last half of a Manchester data "10" corresponding to the NRZ data "1". Thus, a time point at which Tb/4 has elapsed from a bit transition point corresponds to a zero-crossing point Z1. Here, Tb is one bit time in the NRZ data.

In the case where the NRZ data is changed from "0" to "1", "1", which is the first half of Manchester code "10" corresponding to the NRZ data "1", is subtracted from "1", which is the last half of Manchester code "01" corresponding to the NRZ data "0". Thus, a time point at which Tb/4 has elapsed from a bit transition point corresponds to a zero-crossing point Z2.

In the case where the NRZ data makes a transition from "0" to "0", after "1", which is the last half of Manchester code "01" corresponding to the former NRZ data "0", is subtracted from "0", which is the first half of Manchester code "01" corresponding to the former NRZ data "0", "0", which is the first half of Manchester code "01" corresponding to the latter NRZ data "0", is subtracted from "1", which is the last half of Manchester code "01" corresponding to the former NRZ data "0". Thus, a bit transition point of the NRZ data corresponds to a zero-crossing point Z3. After that, "1", which is the last half of Manchester code "01" corresponding to the latter NRZ data "0", is subtracted from "0", which is the first half of Manchester code "01" corresponding to the latter NRZ data "0". Thus, a time point at which Tb/2 has elapsed from a bit transition point of the NRZ data corresponds to a zero-crossing point Z4.

Similarly, in the case where the NRZ data is changed from "1" to "1" (not shown), "1", which is the first half of Manchester code "01" corresponding to the NRZ data "1", is subtracted from "0", which is the last half of Manchester code "10" corresponding to the NRZ data "1". Thus, a bit transition point corresponds to a zero-crossing point, and a time point at which Tb/2 has elapsed from a bit transition point corresponds to a zero-crossing point.

As will be described below, the zero-crossing time interval is Tb/2, 3Tb/4, or Tb, depending on the NRZ data pattern.

That is, if the NRZ data pattern alternates between "0"s and "1"s such as "101" or "010", a time point (Z1 or Z2) at which Tb/4 has elapsed from a bit transition point corresponds to a zero-crossing point. Thus, the zero-crossing time interval of the subtracted signal outputted from the data extraction section 10 is Tb.

Also, assume that the NRZ data pattern is "100", for example, in which the first bit is followed by two bits whose symbol are different from that of the first bit, as in "100" or "011". In a pattern "10" included in the pattern "100", as described above, a zero-crossing point Z1 appears at a time point at which Tb/4 has elapsed from a time point at which a transition is made from the first bit "1" to the second bit "0". In a pattern "00" included in the pattern "100", as described above, a zero-crossing point Z3 appears at a time point at which a transition is made from the second bit "0" to the third bit "0". After that, a zero-crossing point Z4 appears at a time point at which Tb/2 has elapsed from a time point at which a transition is made from the second bit "0" to the third bit "0". Thus, in the case where the pattern "100" is received, a zero-crossing point Z3 appears after a zero-crossing point Z1. After the zero-crossing point Z3, a zero-crossing point Z4 appears. As a result, a zero-crossing time interval is 3Tb/4 and Tb/2. Similarly, in the case where a pattern "011" is received, a zero-crossing time interval becomes Tb/2 after 3Tb/4.

Also, if the NRZ data pattern is consecutive "0"s or "1"s such as "000" and "111", the zero-crossing time interval becomes Tb/2 (see FIG. 2C).

Also, assume that the NRZ data pattern is "001", for example, in which a symbol of the third bit is different from those of the first and second bits, as in "001" or "110". In a pattern "00" included in the pattern "001", as described above, a zero-crossing point Z3 appears at a time point at which a transition is made from the first bit "0" to the second bit "0". A zero-crossing point Z4 appears at a time point at which Tb/2 has elapsed from the time point at which the zero-crossing point Z3 appears. In a pattern "01" included in the pattern "001", as described above, a zero-crossing point Z1 appears at a time point at which Tb/4 has elapsed from a time point at which a transition is made from the second bit "0" to the third bit "1". Thus, in the case where a pattern "001" is received, a zero-crossing point Z4 appears after a zero-crossing point Z3. After the zero-crossing point Z4, a zero-crossing point Z1 appears. As a result, a zero-crossing time interval is Tb/2 and 3Tb/4. Similarly, in the case where a pattern "110" is received, a zero-crossing time interval becomes 3Tb/4 after Tb/2.

As such, in the case where the zero-crossing time interval is Tb/2 or 3Tb/4, two zero-crossing points may appear within one bit time. Thus, it is impossible to determine to which zero-crossing point the data clock signal should be synchronized.

On the other hand, in the case where the zero-crossing time interval is Tb, only one zero-crossing point appears within one bit time. Thus, by synchronizing the data clock signal to this zero-crossing point, it is possible to perform Manchester decoding correctly.

Thus, the clock extraction section 13 outputs a synchronous signal when the zero-crossing time interval of the subtracted signal outputted from the data extraction section 10 is one bit time Tb.

Figure 3:
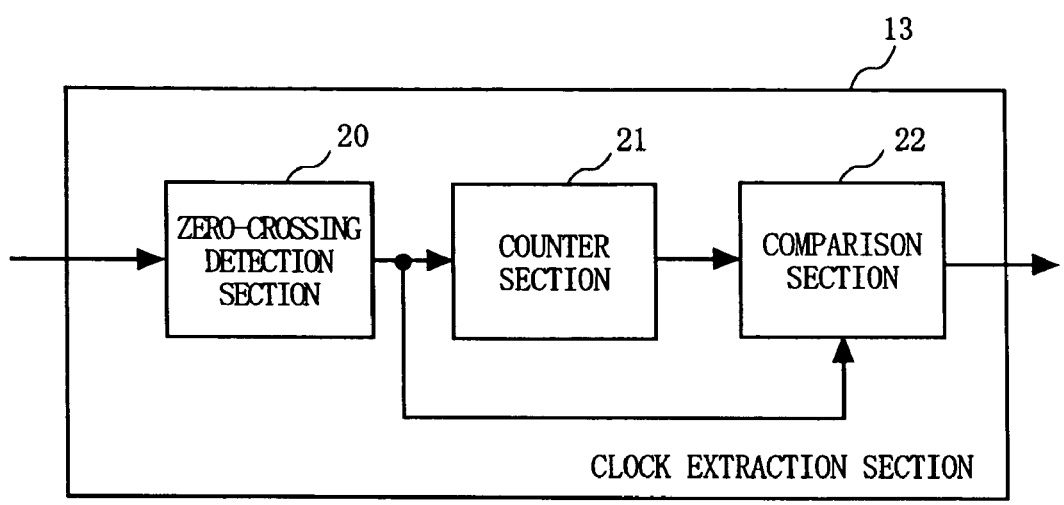
FIG. 3 is a block diagram showing one example of a functional structure of the clock extraction section 13.

The clock extraction section 13 has a functional structure as shown in FIG. 3, for example. FIG. 3 is a block diagram showing one example of a functional structure of the clock extraction section 13. The clock extraction section 13 includes a zero-crossing detection section 20, a counter section 21, and a comparison section 22. The zero-crossing detection section 20 detects zero-crossing points (Z1, Z2, Z3, Z4) of the subtracted signal (see FIG. 2C) outputted from the data extraction section 10, and outputs a zero-crossing signal when each zero-crossing point is detected. Reception of a zero-crossing signal triggers a reset of the counter of the counter section 21, and the counter section 21 continues counting until a next zero-crossing signal is received. The comparison section 22 compares a count value counted by the counter section 21, when the zero-crossing signal is inputted from the zero-crossing detection section 20, with previously-stored one bit time Tb. In the case where the count value counted by the counter section 21 when the zero-crossing signal is inputted from the zero-crossing detection section 20 is equal to the previously-stored one bit time Tb, the comparison section 22 outputs a synchronous signal (see FIG. 2D). As such, a synchronous signal is outputted when the zero-crossing time interval is Tb.

The clock recovery section 14 outputs a data clock signal, which is used for obtaining the NRZ data from the subtracted signal, by synchronizing the data clock signal to the synchronous signal outputted from the clock extraction section 13 (see FIG. 2E). In an example as shown in FIG. 2E, it is assumed that the clock recovery section 14 synchronizes the synchronous signal and the falling edge of the data clock signal. Note that the clock recovery section 14 may synchronize the synchronous signal and the rising edge of the data clock signal.

The determination section 15 determines the polarity of the subtracted signal outputted from the data extraction section 10 by using the rising edge of the data clock signal, which is outputted from the clock recovery section 14 and is 180 degrees out of phase (i.e., delayed by 0.5 bit time) with the synchronous signal as a trigger. When the polarity of the subtracted signal is positive, the determination section 15 determines that NRZ data is "1", and outputs the determination results as NRZ data (see FIG. 2F). Similarly, when the polarity of the subtracted signal is negative, the determination section 15 determines that NRZ data is "0", and outputs the determination results as NRZ data (see FIG. 2F). As shown in FIG. 2F, the original NRZ data is correctly demodulated. As such, the determination section 15 determines the polarity of the subtracted signal at a time delayed from the synchronous signal by 0.5 bit time. The time delayed from the synchronous signal by 0.5 bit time is indicated by each arrow as shown in FIG. 2C. The amplitude value of the subtracted signal reaches its peak value at the time delayed from the synchronous signal by 0.5 bit time, whereby it is possible to demodulate the NRZ data with an excellent error correction rate.

As such, according to the first embodiment, the data extraction section 10 outputs a signal including an NRZ data component from a detected signal by subtracting the amplitude value of the detected signal from the amplitude value of a delayed signal obtained by delaying the detected signal by 0.5 bit time. The clock extraction section 13 outputs a synchronous signal synchronized with a zero-crossing point when the zero-crossing time interval of the output signal outputted from the data extraction section 10 is one bit time Tb. The clock recovery section 14 outputs a data clock signal synchronized with the synchronous signal. The determination section 15 determines the polarity of the output signal outputted from the data extraction section 10 based on the data clock signal outputted from the clock recovery section 14, and obtains NRZ data. Thus, it is possible to obtain NRZ data without calculating a threshold value based on the detected signal. Also, even if the detected signal is distorted, the amplitude value relation between the first- and last-bit signal does not change. Thus, it is possible to obtain NRZ data without the need for a special threshold value control. Furthermore, as shown in FIG. 1, the data extraction section 10 has a simple configuration consisting of the delay section 11 and the subtraction section 12. Thus, it is possible to obtain NRZ data without the need for complicated control requiring fine adjustment. Also, in the first embodiment, the same signal is utilized as a subtracted signal for polarity determination and phase adjustment of a data clock signal, whereby it is possible to perform demodulation of NRZ data and recovery of a data clock signal by a very simple configuration consisting of the delay section 11, the subtraction section 12, the clock extraction section 13, the clock recovery section 14, and the determination section 15.

As described above, in the present invention, the clock extraction section outputs a synchronous signal to which a data clock signal is synchronized by utilizing the fact that the zero-crossing time interval becomes a predetermined value when a pattern alternating between "1"s and "0"s is received. Specifically, the clock extraction section outputs a synchronous signal by utilizing the fact that the time interval between two consecutive zero-crossing points of the subtracted signal becomes Tb when the data pattern alternating between "1"s and "0"s is received. Also, the determination section demodulates the NRZ data by determining the polarity of the subtracted signal at a timing which is 180 degrees out of phase (i.e., delayed by 0.5 bit time) with the synchronous signal.

Note that, in Manchester encoding, NRZ data "0" may be mapped to "10" and NRZ data "1" may be mapped to "01". Also in this case, if the NRZ data pattern alternates between "0"s and "1"s such as "101" or "010", the zero-crossing time interval becomes Tb. Also, as described above, the zero-crossing time interval becomes 3Tb/4 or Tb/2, depending on the NRZ data pattern. In this case, however, when the polarity of the subtracted signal is negative, NRZ data corresponds to "1", and when the polarity of the subtracted signal is positive, NRZ data corresponds to "0".

Note that, in the first embodiment, it is assumed that a signal including an NRZ data component is obtained by subtracting a detected signal from a delayed signal obtained by delaying the detected signal by 0.5 bit time. Alternatively, a signal including an NRZ data component can also be obtained by subtracting the delayed signal from the detected signal. In this case, when the polarity of the subtracted signal is negative, NRZ data corresponds to "1", and when the polarity of the subtracted signal is positive, NRZ data corresponds to "0". Note that, in the case where NRZ data "0" is mapped to "10" and NRZ data "1" is mapped to "01" in Manchester encoding, when the polarity of the subtracted signal is positive, NRZ data corresponds to "1", and when the polarity of the subtracted signal is negative, NRZ data corresponds to "0".

Note that, in the above description, the clock extraction section detects the time interval between two consecutive zero-crossing points of the subtracted signal. However, the clock extraction section may detect the zero-crossing time interval in the same direction, that is, a falling-edge zero-crossing point (at which the polarity changes from positive to negative) or a rising-edge zero-crossing point (at which the polarity changes from negative to positive). Specifically, as shown in FIG. 2C, when a pattern alternating between "1"s and "0"s is received, the time interval between falling-edge zero-crossing points becomes 2Tb. In this case, the clock extraction section may output a synchronous signal when it is detected that the time interval between falling-edge zero-crossing points is 2Tb. Also, when a pattern alternating between "0"s and "1"s is received (not shown in FIG. 2C), the time interval between rising-edge zero-crossing points becomes 2Tb. In this case, the clock extraction section may output a synchronous signal when it is detected that the time interval between rising-edge zero-crossing points is 2Tb. Also, the determination section may determine the polarity of the subtracted signal at a timing which is 180 degrees out of phase (i.e., delayed by 0.5 bit time) with the synchronous signal. Also in the following various embodiments, the clock extraction section may detect a falling-edge zero-crossing point or a rising-edge zero-crossing point.

Note that, in the above description, it is defined that a zero-crossing point is a point at which the signal amplitude value becomes zero if a threshold value is set to an amplitude value of zero. However, the threshold value is not limited to an amplitude value of zero. That is, a zero-crossing point is a concept including a point at which the subtracted signal and the threshold value cross each other (hereinafter referred to as a crossing point). For the sake of simplification, in the present specification, a zero-crossing point obtained by using an amplitude value of zero as a threshold value is described. The above zero-crossing point may be replaced with the crossing point.

Note that, in the first embodiment, it is assumed that the delay amount of the delay section 11 is 0.5 bit time. However, the delay amount is not limited to 0.5 bit time. The ASK demodulation device can demodulate the NRZ data if the delay amount is at least less than one bit time. It can be expected that NRZ data will be demodulated in an accurate manner if the delay amount is more than or equal to 3/24 bit time and less than or equal to 0.5 bit time. Also, even if the delay amount is more than or equal to 0.5 bit time and less than or equal to $^{21}/_{24}$ bit time, it can be expected that NRZ data will be demodulated in an accurate manner. However, as described above, NRZ data can be demodulated in the most accurate manner when the delay amount is 0.5 bit time for the following reasons.

Figure 4:
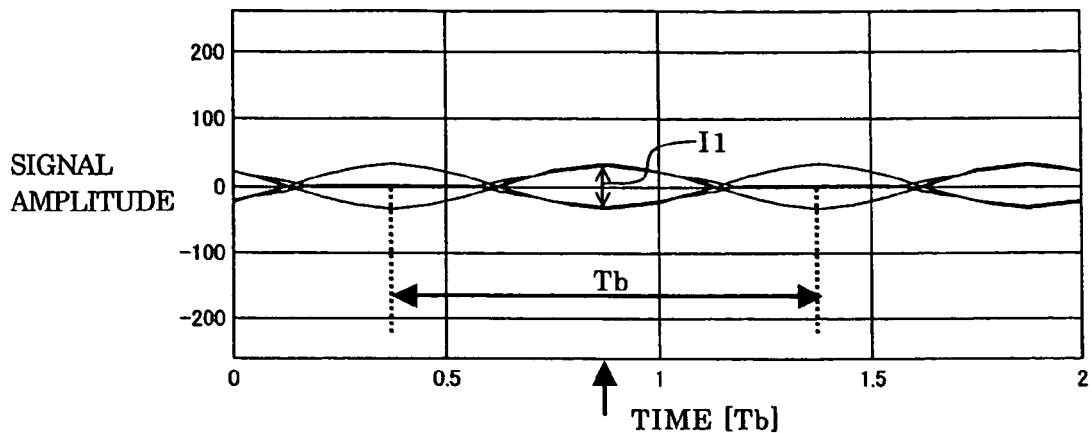
FIG. 4 is an illustration showing an eye pattern of an output signal of a data extraction section 10 in the case where the delay amount of the delay section 11 is $1/24$ bit time.
Figure 5:
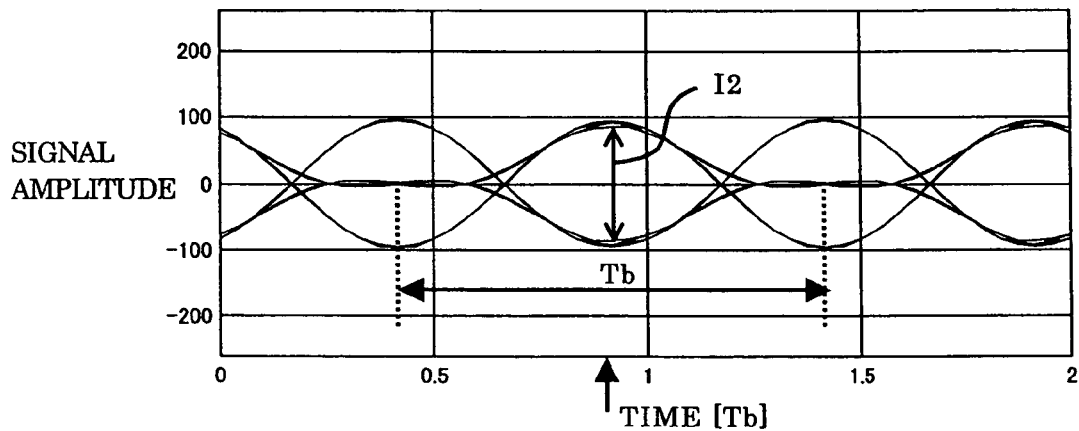
FIG. 5 is an illustration showing an eye pattern of an output signal of the data extraction section 10 in the case where the delay amount of the delay section 11 is $3/24$ bit time.
Figure 6:
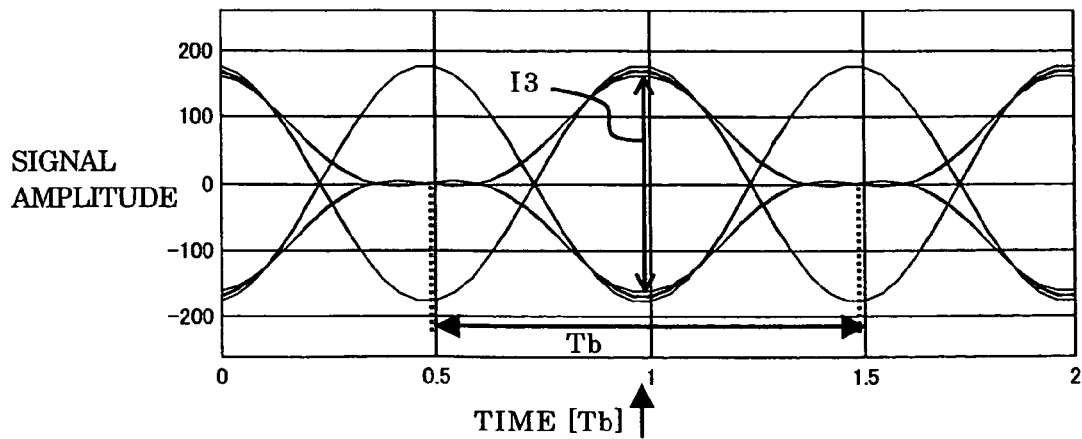
FIG. 6 is an illustration showing an eye pattern of an output signal of the data extraction section 10 in the case where the delay amount of the delay section 11 is $6/24$ bit time.
Figure 7:
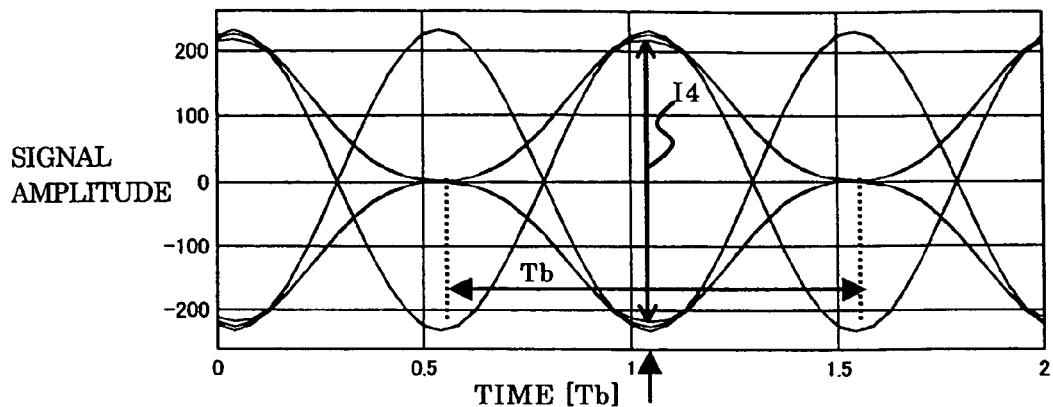
FIG. 7 is an illustration showing an eye pattern of an output signal of the data extraction section 10 in the case where the delay amount of the delay section 11 is $9/24$ bit time.
Figure 8:
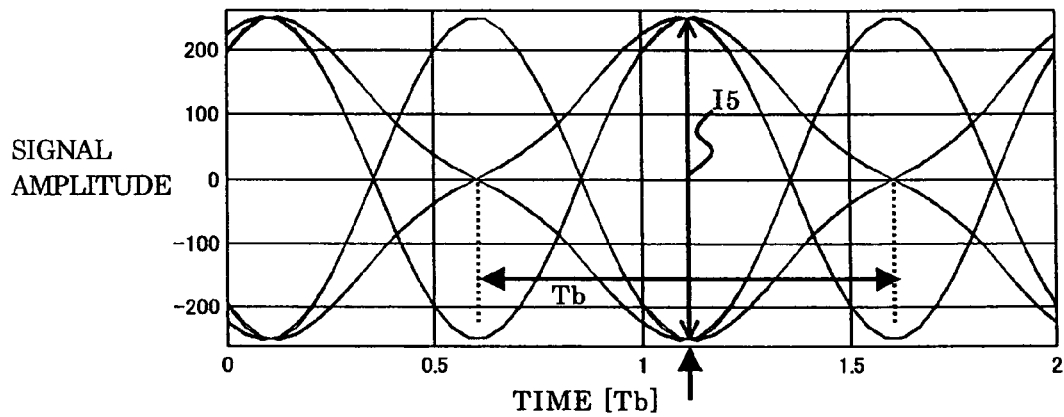
FIG. 8 is an illustration showing an eye pattern of an output signal of the data extraction section 10 in the case where the delay amount of the delay section 11 is $12/24$ (=0.5) bit time.
Figure 9:
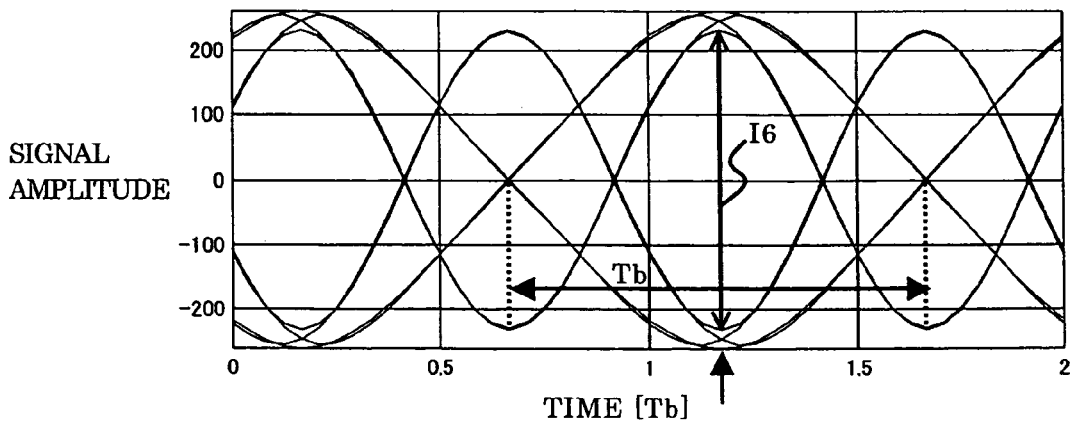
FIG. 9 is an illustration showing an eye pattern of an output signal of the data extraction section 10 in the case where the delay amount of the delay section 11 is $15/24$ bit time.
Figure 10:
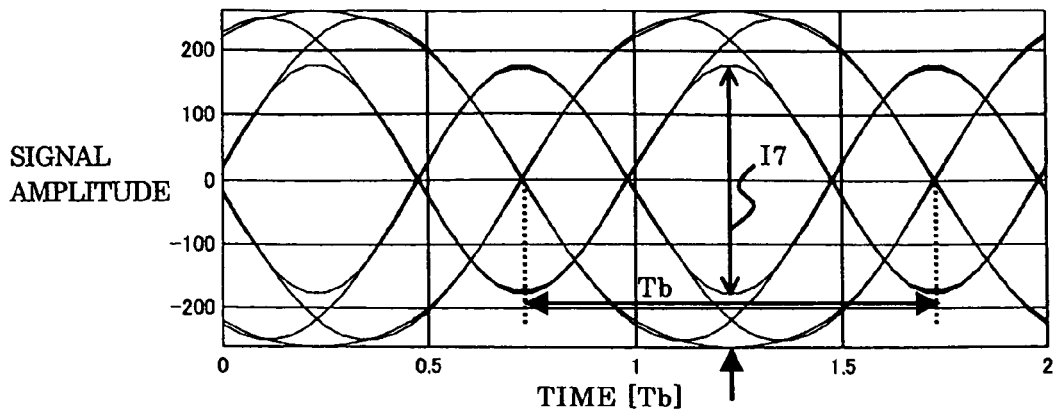
FIG. 10 is an illustration showing an eye pattern of an output signal of the data extraction section 10 in the case where the delay amount of the delay section 11 is $18/24$ bit time.
Figure 11:
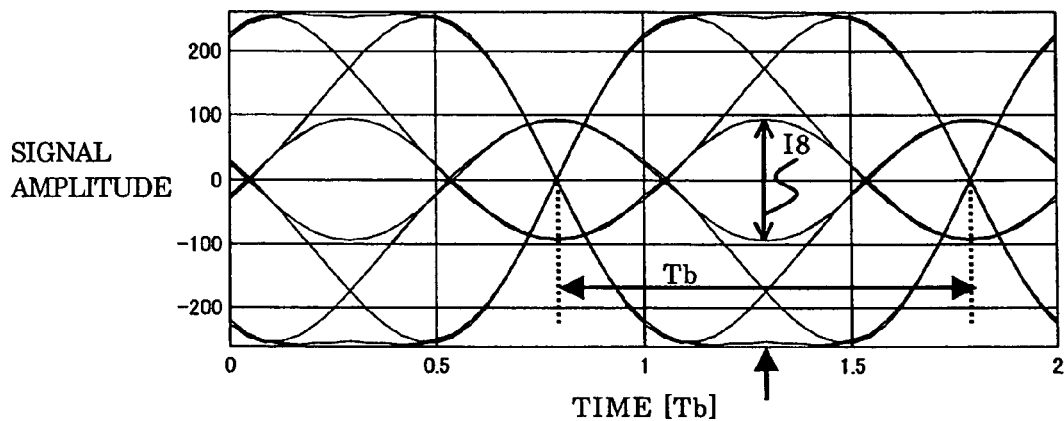
FIG. 11 is an illustration showing an eye pattern of an output signal of the data extraction section 10 in the case where the delay amount of the delay section 11 is $21/24$ bit time.
Figure 12:
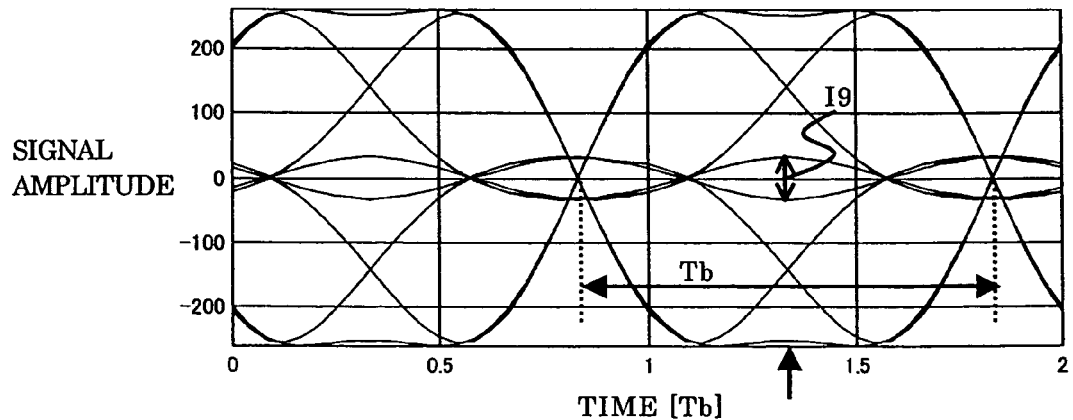
FIG. 12 is an illustration showing an eye pattern of an output signal of the data extraction section 10 in the case where the delay amount of the delay section 11 is $23/24$ bit time.
Figure 13:
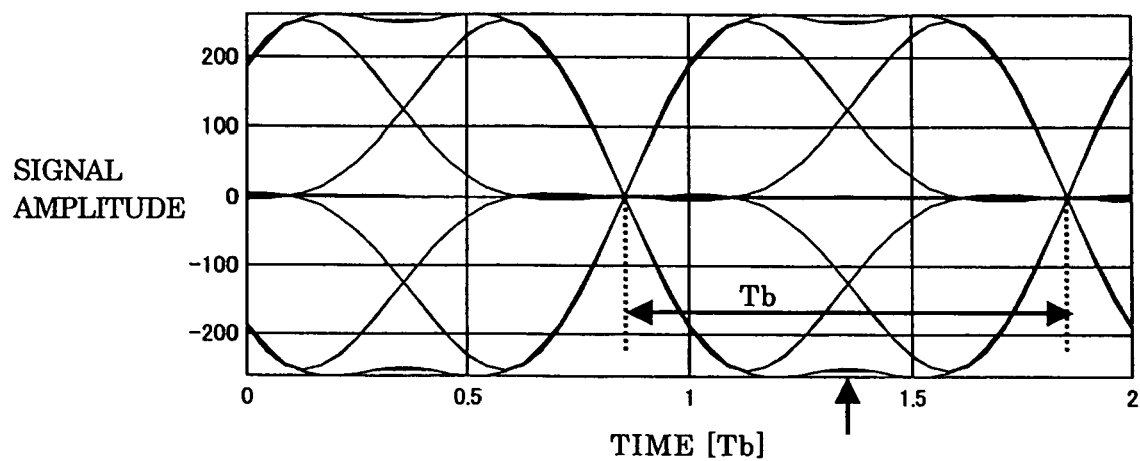
FIG. 13 is an illustration showing an eye pattern of an output signal of the data extraction section 10 in the case where the delay amount of the delay section 11 is one bit time.

FIG. 4 is an illustration showing an eye pattern of an output signal of the data extraction section 10 in the case where the delay amount of the delay section 11 is $^{1}/_{24}$ bit time. FIG. 5 is an illustration showing an eye pattern of an output signal of the data extraction section 10 in the case where the delay amount of the delay section 11 is $^{3}/_{24}$ bit time. FIG. 6 is an illustration showing an eye pattern of an output signal of the data extraction section 10 in the case where the delay amount of the delay section 11 is $^{6}/_{24}$ bit time. FIG. 7 is an illustration showing an eye pattern of an output signal of the data extraction section 10 in the case where the delay amount of the delay section 11 is $^{9}/_{24}$ bit time. FIG. 8 is an illustration showing an eye pattern of an output signal of the data extraction section 10 in the case where the delay amount of the delay section 11 is $^{12}/_{24}$ (=0.5) bit time. FIG. 9 is an illustration showing an eye pattern of an output signal of the data extraction section 10 in the case where the delay amount of the delay section 11 is $^{15}/_{24}$ bit time. FIG. 10 is an illustration showing an eye pattern of an output signal of the data extraction section 10 in the case where the delay amount of the delay section 11 is $^{18}/_{24}$ bit time. FIG. 11 is an illustration showing an eye pattern of an output signal of the data extraction section 10 in the case where the delay amount of the delay section 11 is $^{21}/_{24}$ bit time. FIG. 12 is an illustration showing an eye pattern of an output signal of the data extraction section 10 in the case where the delay amount of the delay section 11 is $^{23}/_{24}$ bit time. FIG. 13 is an illustration showing an eye pattern of an output signal of the data extraction section 10 in the case where the delay amount of the delay section 11 is one bit time.

In FIGS. 4 to 13, a time point indicated by an arrow in the eye pattern is a time point delayed from a zero-crossing point by 0.5 bit time in the case where the zero-crossing time interval is Tb (i.e., in the case where the NRZ data pattern alternates between "0"s and "1"s such as "101" or "010"). The polarity of the subtracted signal is determined at the above time point. Thus, this time point is referred to as a sampling point.

As shown in FIGS. 4 to 8, eye pattern openings I1, I2, I3, and I4 at the sampling point, when the delay amount of the delay section 11 is less than 0.5 bit time, are narrower than an eye opening I5 at the sampling point when the delay amount is 0.5 bit time. Also, as shown in FIGS. 8 to 12, eye pattern openings I6, I7, I8, and I9, when the delay amount of the delay section 11 is more than 0.5 bit time, are narrower than an eye pattern opening I5 at the sampling point when the delay amount is 0.5 bit time. Furthermore, as shown in FIG. 13, in the case where the delay mount of the delay section 11 is one bit time, the eye is closed. Also, in the case where the delay amount is zero bit time (not shown), that is, in the case where there is no delay, the eye is closed. The narrower the eye opening becomes, the more frequently noise errors occur. As a result, if the delay amount is zero or one bit time (i.e, in the case where the eye is closed), it is completely impossible to perform demodulation. Thus, the delay amount should be at least more than zero bit time and less than one bit time. As shown in FIG. 6, the eye has maximum opening when the delay amount is 0.5 bit time, whereby it is evident that 0.5 bit time delay is most preferable.

As shown in FIGS. 4 to 7, when the delay amount is less than 0.5 bit time, an interval in which the amplitude of the output signal outputted from the data extraction section 10 is zero (hereinafter referred to as a zero interval) becomes gradually wider. The wider zero interval may make it difficult to detect that the zero-crossing time interval is Tb. However, the zero-crossing time interval Tb can sometimes be detected since noise is added to an actual signal. Thus, even if the delay amount is less than 0.5 bit time, the ASK demodulation device can demodulate the NRZ data. However, the less the delay amount becomes, the narrower the eye pattern opening becomes. Thus, it is preferable that the delay amount having a certain degree of eye pattern opening be provided. Empirically, the eye pattern opening as shown in FIG. 5 reduces errors in a signal to a level that ensures the practical use of the device. Therefore, the delay amount should be more than or equal to $^{3}/_{24}$ bit time and less than or equal to 0.5 bit time.

As shown in FIGS. 9 to 12, when the delay amount is more than 0.5 bit time, no zero interval appears. Thus, compared to the case in which the delay amount is less than 0.5 bit time, it is easier to detect that the zero-crossing time interval is Tb. Therefore, by setting the delay amount to more than or equal to 0.5 bit time and less than one bit time, it is possible to easily detect that the zero-crossing time interval is Tb. However, the more the delay amount becomes, the narrower the eye pattern opening becomes. Thus, it is preferable that the delay amount having a certain degree of eye pattern opening be provided. Empirically, the eye pattern opening as shown in FIG. 11 reduces errors in a signal to a level that ensures the practical use of the device. Therefore, the delay amount should be more than or equal to 0.5 bit time and less than or equal to $^{21}/_{24}$ bit time.

Second Embodiment

Figure 14:
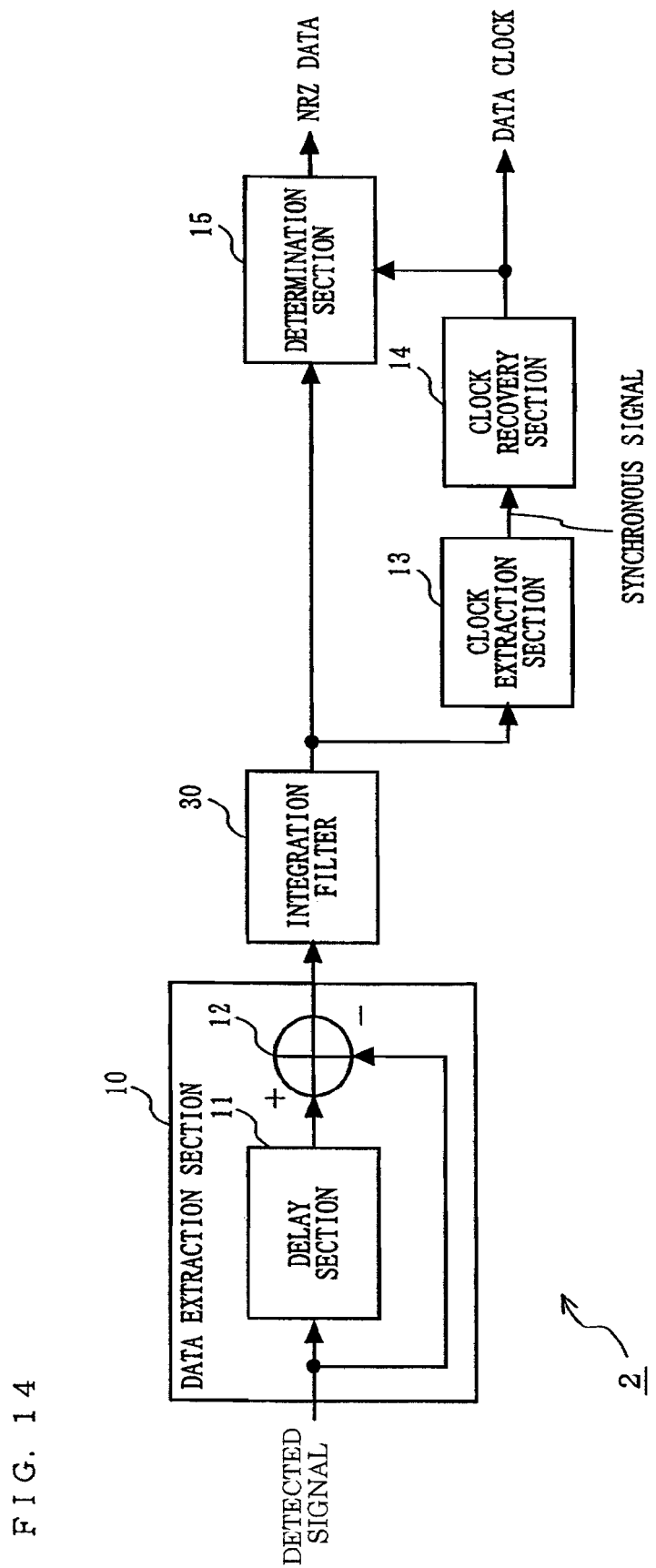
FIG. 14 is a block diagram showing a structure of an ASK demodulation device 2 according to a second embodiment of the present invention.

FIG. 14 is a block diagram showing a structure of an ASK demodulation device 2 according to a second embodiment of the present invention. In FIG. 14, the ASK demodulation device 2 includes the data extraction section 10, an integration filter 30, the clock extraction section 13, the clock recovery section 14, and the determination section 15. In FIG. 14, any component elements function similarly to their counterparts in the ASK demodulation device 1 as shown in FIG. 1 according to the first embodiment will be denoted by the same reference numerals as those used therein, and the description thereof is omitted.

A detected signal obtained by detecting a modulated signal which is ASK-modulated with a Manchester-encoded data sequence by using a method such as synchronous detection or asynchronous detection is inputted to the ASK demodulation device 2. The detected signal inputted to the ASK demodulation device 2 is inputted to the data extraction section 10. The data extraction section 10 outputs a signal including an NRZ data component from the detected signal.

The integration filter 30 uses the output signal of the data extraction section 10 as an input, integrates the input signal continuously in a predetermined integration period, and outputs the integration result. The output signal of the integration filter 30 is inputted to the clock extraction section 13 and the determination section 15. The second embodiment differs from the first embodiment in that the integration filter 30 is connected to a following stage of the data extraction section 10.

Figure 15:
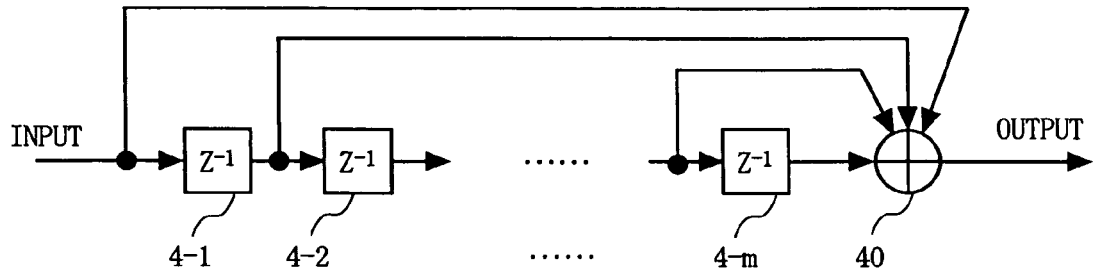
FIG. 15 is a block diagram showing one example of a structure of an integration filter 30.

The integration filter 30 will be described. The integration filter 30 integrates the input signal of 0.5 bit time in a continuous manner, and outputs the integration result. FIG. 15 is a block diagram showing one example of a structure of the integration filter 30. In FIG. 15, the integration filter 30 includes m delay devices 4-1, 4-2, . . . , and 4-m, and an adder 40. The integration filter 30 as shown in FIG. 15 is a transversal filter. Here, assume that the input signal to the integration filter 30 is sampled in a sampling cycle. The delay devices 4-1, 4-2, ..., and 4-m delay the input signal by one sampling cycle. The adder 40 adds the input signal to the integration filter 30 and the output signal outputted from each of the delay devices, and outputs the addition result. As a result, the integration filter 30 integrates the signal in a (m+1) sampling cycle. The (m+1) sampling cycle corresponds to 0.5 bit time.

In general, by performing integration processing, the integration filter doubles as a low-pass filter for removing a high-frequency component included in the input signal. Thus, the ASK demodulation device 2 according to the second embodiment removes noise added to the detected signal by the integration filter 30. As a result, compared to the first embodiment, it is possible to increase SNR (Signal to Noise Ratio) and provide excellent bit error rate characteristics.

Especially, by setting a predetermined period (integration period) in which integration is performed by the integration filter 30 to 0.5 bit time, a correlation receiver for obtaining a correlation between a detected signal and a rectangular signal can be structured by the data extraction section 10 and the integration filter 30, which will be described below. Thus, compared to the first embodiment, it is possible to provide excellent bit error rate characteristics.

Here, assume that the detected signal is sampled in a sampling cycle T by a sampling section (not shown) for integration. Also, assume that the detected signal is a (t), the output signal of the data extraction section 10 is b (t), and the output signal of the integration filter 30 is c (t). The data extraction section 10 subtracts the amplitude value of the detected signal from the amplitude value of a signal obtained by delaying the detected signal by 0.5 bit time. Thus, a relationship between a (t) and b (t) is expressed by equation 1.

$$b(t) = a(t - T_b/2) - a(t) \quad \text{[equation 1]}$$

Also, the integration filter 30 integrates the output signal of the data extraction section 10 for 0.5 bit time. Thus, a relationship between b (t) and c (t) is expressed by equation 2.

$$c(t) = \int_{t-T_b/2}^{t} b(\tau) d\tau \quad \text{[equation 2]}$$

When equation 1 is substituted into equation 2, equation 3 is obtained.

$$c(t) = \int_{t-T_b/2}^{t} \{a(\tau - T_b/2) - a(\tau)\} d\tau \quad \text{[equation 3]}$$
$$= \int_{t-T_b/2}^{t} a(\tau - T_b/2) d\tau - \int_{t-T_b/2}^{t} a(\tau) d\tau$$

When change of variables: $\tau' = \tau - T_b/2$ is performed for the first term of the right-hand side of equation 3, equation 4 is obtained.

$$c(t) = \int_{t-T_b}^{t-T_b/2} a(\tau') d\tau' - \int_{t-T_b/2}^{t} a(\tau) d\tau \quad \text{[equation 4]}$$

Next, a correlation receiver for obtaining a correlation between a detected signal a (t) and a rectangular signal h (t), which is expressed by equation 5, will be studied.

$$h(t) = \begin{cases} 1 & (0 \le t < T_b/2) \\ -1 & (T_b/2 \le t \le T_b) \\ 0 & (t < 0, t > T_b) \end{cases} \quad \text{[equation 5]}$$

In order to obtain h (t) expressed by equation 5, a waveform of the Manchester-encoded NRZ data "1" is shifted in the amplitude direction, and a direct current component is removed therefrom. The direct current component can be ignored since the Manchester-encoded data has information in a direction of the level transition at the bit center. The correlation receiver for obtaining a correlation between a (t) and h (t) is known for being the equivalent of a matched filter for receiving h (t). An impulse response g (t) of the matched filter for receiving h (t) is obtained by applying time reversal to h (t) and delaying h (t) by Tb, which is an impulse response time, and is expressed by equation 6.

$$g(t) = \begin{cases} -1 & (0 \le t < T_b/2) \\ 1 & (T_b/2 \le t \le T_b) \\ 0 & (t < 0, t > T_b) \end{cases} \quad \text{[equation 6]}$$

An output d (t) of the correlation receiver for obtaining a correlation between a (t) and h (t) is obtained by applying convolution integration to a (t) and g (t), and is expressed by equation 7.

$$d(t) = \int_{-\infty}^{\infty} a(t-\tau) \cdot g(\tau) d\tau \quad \text{[equation 7]}$$
$$= \int_{T_b/2}^{T_b} a(t-\tau) d\tau - \int_{0}^{T_b/2} a(t-\tau) d\tau$$

When change of variables: $\tau' = t - \tau$ is performed for the right-hand side of equation 7, equation 8 is obtained.

$$d(t) = \int_{t-T_b}^{t-T_b/2} a(\tau')(-d\tau') - \int_{t}^{t-T_b/2} a(\tau')(-d\tau') \quad \text{[equation 8]}$$
$$= \int_{t-T_b}^{t-T_b/2} a(\tau') d\tau' - \int_{t-T_b/2}^{t} a(\tau') d\tau'$$

It is evident that c (t) expressed by equation 4 and d (t) expressed by equation 8 are identical to each other. Thus, in the second embodiment, it has been described that the correlation receiver for obtaining a correlation between a detected signal and a rectangular signal h (t) can be structured by the data extraction section 10 and the integration filter 30 if an integration period of the integration filter 30 is 0.5 bit time.

In the first embodiment, an integration filter is not provided therein, and one piece of information in each of the first- and last-bit signal is used. As a result, bit errors often occur when noise is added. However, as in the second embodiment, it is possible to obtain a correlation between a detected signal and a rectangular signal by structuring a correlation receiver by setting an integration period of the integration filter 30 to 0.5 bit time. Thus, compared to the first embodiment, the number of bit errors caused by additive noise is reduced, whereby it is possible to improve bit error rate characteristics.

In the case where a detected signal obtained from a modulated signal which is ASK-modulated with Manchester data "10" is inputted, a correlation value obtained from a circuit in which the data extraction section 10 and the integration filter 30 are connected in serial becomes positive. In the case where a detected signal obtained from a modulated signal which is ASK-modulated with Manchester data "01" is inputted, a correlation value becomes negative. Thus, as is the case with the first embodiment, the ASK demodulation device according to the second embodiment can obtain Manchester-decoded NRZ data by determining the polarity of the output signal of the integration filter without the need for threshold value calculation. Also, the clock extraction section 13, the clock recovery section 14, and the determination section 15 as described in the first embodiment can be used in the second embodiment.

As described above, the integration filter 30 doubles as a low-pass filter. Other than that, the integration filter 30 makes it easier for the clock extraction section 13 to detect that the zero-crossing time interval is Tb.

Figure 16A:
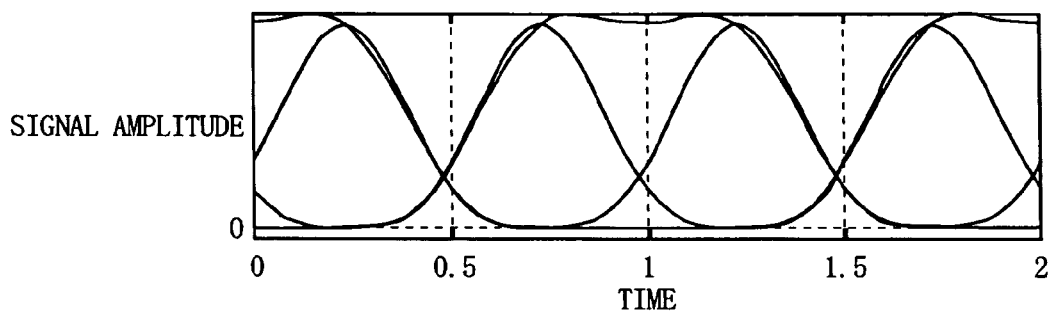
FIG. 16A is an illustration of an eye pattern of a detected signal.
Figure 16B:
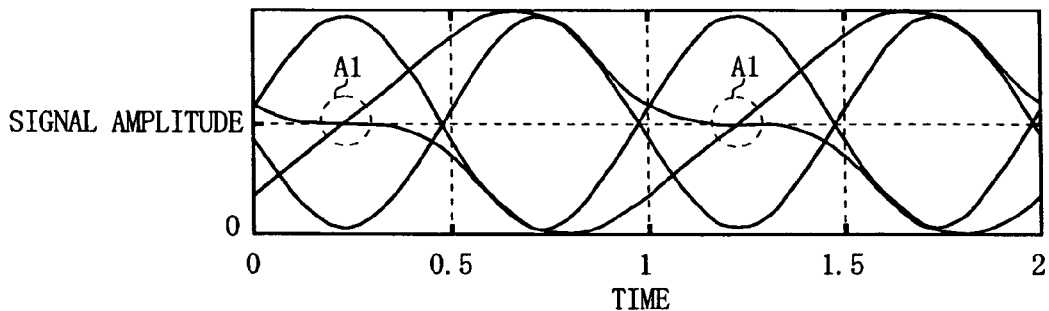
FIG. 16B is an illustration showing an eye pattern of an output signal of the data extraction section 10.
Figure 16C:
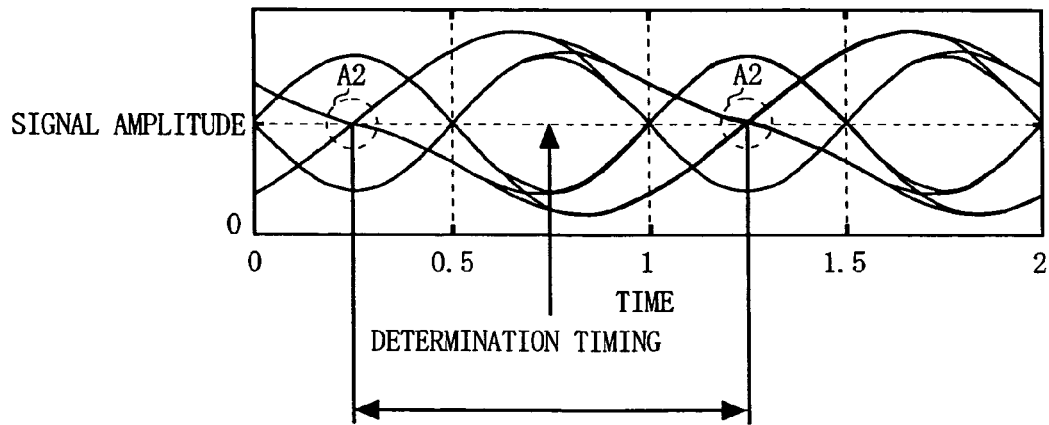
FIG. 16C is an illustration showing an eye pattern of an output signal of the integration filter 30.

FIG. 16A is an illustration of an eye pattern of a detected signal. FIG. 16B is an illustration showing an eye pattern of an output signal of the data extraction section 10. FIG. 16C is an illustration showing an eye pattern of an output signal of the integration filter 30. The horizontal axis represents time normalized by the bit time. The vertical axis represents signal amplitude. Hereinafter, with reference to FIGS. 16A, 16B, and 16C, the reason why the integration filter 30 makes it easier for the clock extraction section 13 to detect that the zero-crossing time interval is Tb will be described.

Here, assume that the integration period of the integration filter 30 is 0.5 bit time. Also, as is the case with the first embodiment, the clock extraction section 13 detects that the zero-crossing time interval of an inputted reception signal is Tb. Thus, in FIGS. 16B and 16C, a signal component whose zero-crossing time interval required for clock recovery is Tb will be studied.

As shown in FIG. 16B, in the output signal of the data extraction section 10, the slope of the line is less steep at A1 around the amplitude zero since the detected signal as shown in FIG. 16A has a long flat portion in which level is not changed. As such, when the slope of the line is less steep around the amplitude zero, the clock extraction section 13 is subject to noise at the time of detection of zero-crossing points. As a result, it is difficult for the clock extraction section 13 to correctly detect zero-crossing points to be detected.

On the other hand, as shown in FIG. 16C, in the output signal of the integration filter 30, the slope of the line is steeper at A2 around the amplitude zero compared to FIG. 16B. This is because fluctuations around the amplitude zero of the signal component whose zero-crossing time interval is Tb are averaged out by the integration filter 30 functioning as a low-pass filter. When the slope of the line at A2 around the amplitude zero is steeper, the clock extraction section 13 is less subject to noise at the time of detection of zero-crossing points. As a result, the clock extraction section 13 can correctly detect zero-crossing points to be detected with ease.

As such, in the case where only the data extraction section 10 is used, some detected signals may make it difficult to detect that the zero-crossing time interval is Tb. However, by using the integration filter 30 in conjunction with the data extraction section 10, it is possible to average out the fluctuations of the signal component whose zero-crossing time interval required for clock recovery is Tb. Thus, even if the detected signal is distorted, it is possible to make it easier for the clock extraction section 13 to detect that the zero-crossing time interval is Tb.

As such, according to the second embodiment, noise added to the detected signal is removed by the integration filter 30. Thus, compared to the first embodiment, it is possible to increase SNR and provide excellent bit error rate characteristics. Especially, by setting the integration period to 0.5 bit time, a correlation receiver for obtaining a correlation between a detected signal and a rectangular signal h (t) is structured by the data extraction section 10 and the integration filter 30. Thus, compared to the first embodiment, it is possible to improve bit error rate characteristics. Also, the fluctuations of the signal component whose zero-crossing time interval required for clock recovery is Tb are averaged out by the integration filter 30. Thus, even if the detected signal is distorted, it is possible to make it easier for the clock extraction section 13 to detect that the zero-crossing time interval is Tb.

Figure 17:
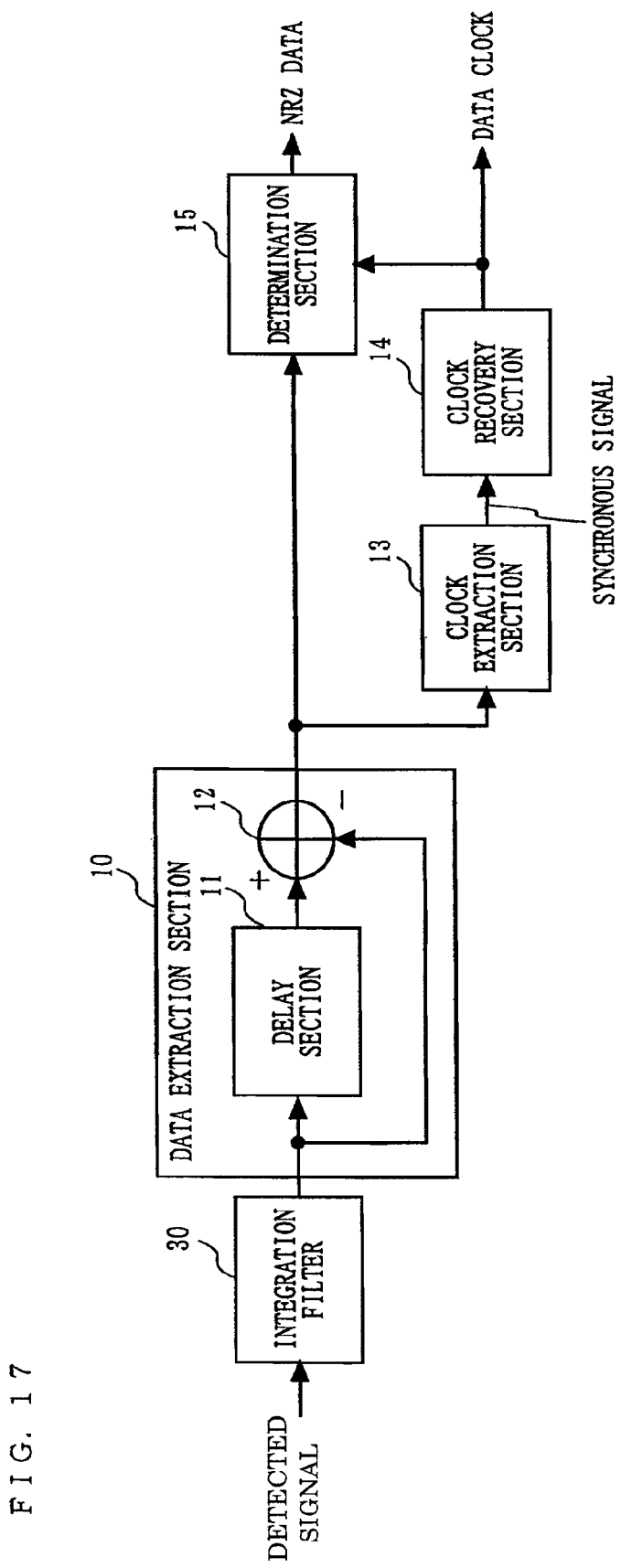
FIG. 17 is an illustration showing a structure of the ASK demodulation device in the case where the integration filter 30 is connected to a previous stage of the data extraction section 10.

Note that, in the second embodiment as shown in FIG. 14, it is assumed that the integration filter 30 is connected to a following stage of the data extraction section 10, but the integration filter 30 may be connected to a previous stage of the data extraction section 10. FIG. 17 is an illustration showing a structure of the ASK demodulation device in the case where the integration filter 30 is connected to a previous stage of the data extraction section 10. The data extraction section 10 and the integration filter 30 are linear time-invariant. Thus, change in the connection order of the data extraction section 10 and the integration filter 30 does not change the result obtained from the circuit in which these two component elements are connected in serial.

Figure 18:
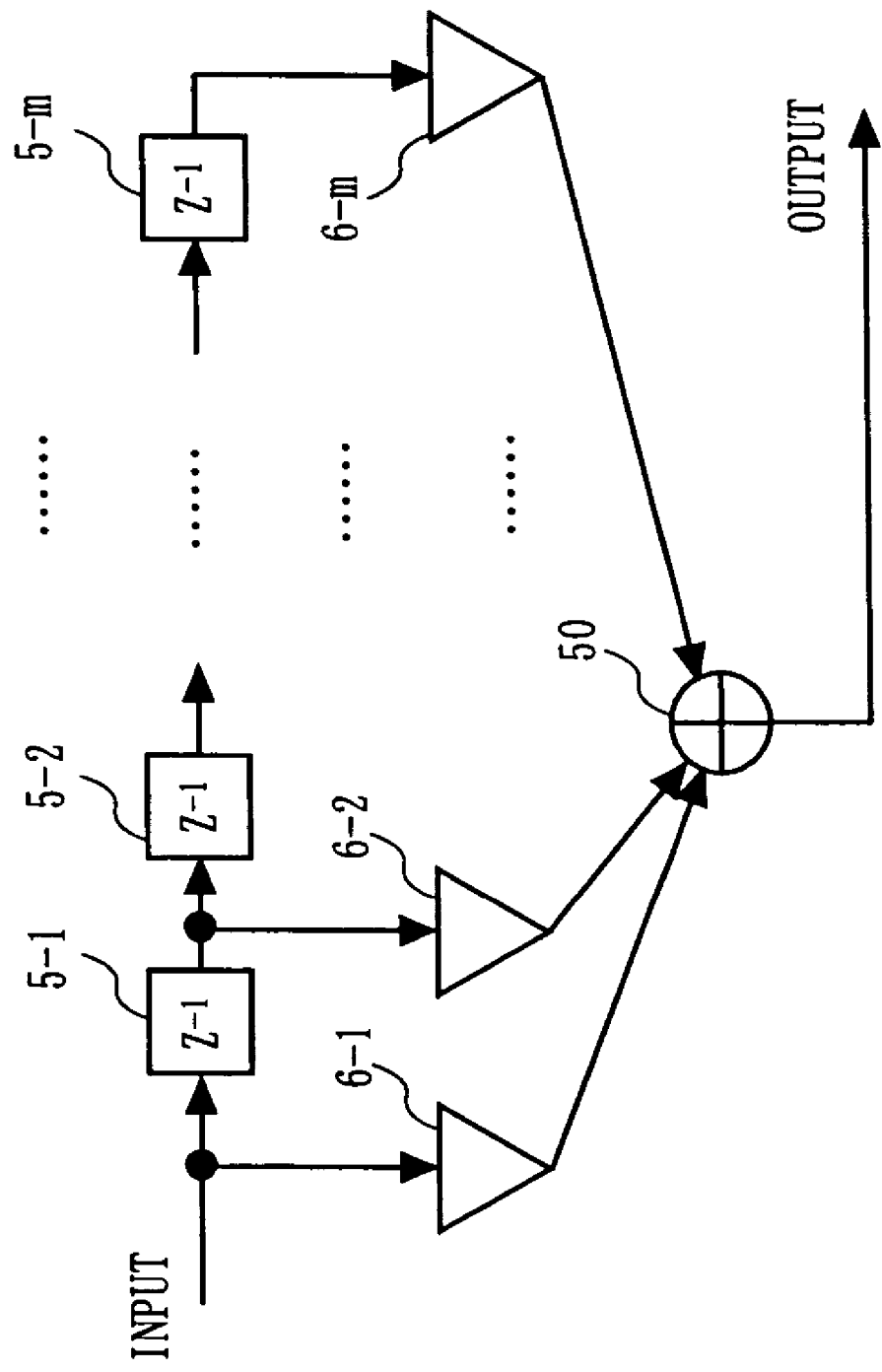
FIG. 18 is an illustration showing a structure of a low-pass filter structured in the form of a Finite Impulse Response (FIR) filter.

Note that, in the second embodiment, it is assumed that the integration filter is used. Alternatively, a low-pass filter for removing a high-frequency component included in an inputted signal may be used. With the low-pass filter, a high-frequency component included in the signal is removed, whereby it is possible to increase SNR and provide excellent bit error rate characteristics compared to the first embodiment. FIG. 18 is an illustration showing a structure of a low-pass filter structured in the form of a Finite Impulse Response (FIR) filter. As shown in FIG. 18, the low-pass filter includes a plurality of delay devices 5-1 to 5-m, a plurality of multipliers 6-1 to 6-m, and an adder 50. Note that, in FIG. 17, it is possible to omit the multiplier in the low-pass filter by using the same coefficient for all the multipliers 6-1 to 6-m. The integration filter can be viewed as a filter for obtaining an average value of continuous m samples in the input signal. Thus, it is evident that the integration filter doubles as the low-pass filter. As a result, the need for the multiplier is eliminated by substituting the integration filter for the low-pass filter, thereby reducing the size of the circuit.

Note that, in the second embodiment, it is assumed that the integration filter whose integration period is 0.5 bit time is used. Alternatively, an integration filter for performing integration in a predetermined period other than 0.5 bit time may be used. By using such an integration filter, it is possible to remove high-frequency noise added to the detected signal.

Note that it is preferable that the above-described predetermined period be less than one bit time for the following reasons. It can be considered that Manchester code includes information (NRZ data component) in a direction of the data transition at the bit center since Manchester code always includes "0" and "1" in one bit of NRZ data. In the case where the integration period is equal to or greater than one bit time, fluctuations in one bit time are averaged out, whereby there is a possibility that even NRZ data may be removed. Thus, the integration period is preferably less than one bit time. It will be understood that it is more preferable that the integration period be 0.5 bit time since, as described in the second embodiment, a correlation receiver for obtaining a correlation between a detected signal and a rectangular signal is structured if the integration period is 0.5 bit time.

Note that even if the integration period of the integration filter 30 is less than 0.5 bit time, noise added to a detected signal can be removed. Thus, compared to the first embodiment, it is possible to increase SNR and provide excellent bit error rate characteristics. As a result, in the present invention, the integration period of the integration filter 30 may be less than 0.5 bit time.

Note that, in the first and second embodiments of the present invention, it is assumed that the clock extraction section 13 detects that the zero-crossing time interval is Tb. Alternatively, a margin may be provided in the zero-crossing time interval to be detected. As a result, even if jitter occurs at the zero-crossing point, it is possible to extract a clock component. Basically, when NRZ data pattern alternating between "0"s and "1"s such as "1010 . . . " is received, the zero-crossing time interval is Tb. However, in practice, the zero-crossing time interval may not be Tb due to influences of noise, etc. Thus, the clock extraction section 13 may extract, from zero-crossing points of the subtracted signal, zero-crossing points whose time interval is more than or equal to Tb−α and less than or equal to Tb+β (0<α≦Tb/8, 0<β≦Tb), and output a synchronous signal synchronized with each of the extracted zero-crossing points. As such, by providing margin such as α and β, the clock extraction section 13 can extract a clock component even if the zero-crossing time interval is not Tb due to noise. In this case, however, too large values of α and β increase jitter of the data clock signal and cause deterioration in characteristics. Therefore, the values of a and P need to be appropriately set.

It is preferable that the value of α be equal to or smaller than Tb/8. As described above, the zero-crossing time interval of the output signal outputted from the data extraction section 10 is Tb/2, 3Tb/4, or Tb. In the case where α is greater than Tb/8, the clock extraction section 13 detects a value smaller than 7Tb/8, which is an average value of 3Tb/4 and Tb, whereby there is a high probability that 3Tb/4 is detected by mistake. As a result, the clock extraction section 13 inputs an incorrect synchronous signal to the clock recovery section 14, whereby a the clock recovery section 14 recovers shifted data clock signal, and bit error rate characteristics are deteriorated. Thus, it is preferable that the value of a be equal to or smaller than Tb/8.

It is preferable that the value of β be equal to or smaller than Tb. When the zero-crossing time interval is originally Tb, the zero-crossing time interval never exceeds 2Tb, although it may sometimes exceed Tb due to influences of noise. This is because there are only three zero-crossing time intervals Tb/2, 3Tb/4, and Tb, and a next zero-crossing point is generated after a maximum duration of 2Tb. Thus, it is preferable that the value of β be equal to or smaller than Tb. A zero-crossing time interval exceeding 2Tb implies that signals are buried in noise. Under such conditions, it is impossible to demodulate the signals correctly.

Note that, in the second embodiment, as is the case with the first embodiment, the delay amount is not limited to 0.5 bit time.

Note that, in the first and second embodiments of the present invention, a detected signal obtained by detecting a modulated signal which is ASK-modulated with a Manchester-encoded data sequence may be obtained by a method other than synchronous detection or asynchronous detection (envelope detection). For instance, a signal proportional to the square of the amplitude of the modulated signal may be used as a detected signal using square detection by which an output signal proportional to the square of the amplitude of the input signal is obtained. Also, for example, an in-phase component I and an orthogonal component Q may be obtained by performing orthogonal detection for the modulated signal for calculating the sum of the squares $I^2+Q^2$, thereby using the calculation result as a detected signal. The signal proportional to the square of the amplitude of the modulated signal is distorted. However, even if the detected signal is distorted, the ASK demodulation device according to the first and second embodiments of the present invention does not need calculation of a threshold value or special adjustment. Thus, it is possible to demodulate a modulated signal with high accuracy. It will be understood that the ASK demodulation device may calculate the square root of a signal proportional to the square of the amplitude of the modulated signal obtained by the above-described square detection or orthogonal detection, and obtain a signal proportional to the amplitude of the modulated signal, thereby using the obtained signal as a detected signal.

Third Embodiment

The ASK demodulation devices 1 and 2 according to the first and second embodiments, respectively, obtain NRZ data whose bit error rate is low by adjusting a data clock signal utilizing the fact that the zero-crossing time interval of the output signal of the data extraction section 10 is Tb when an NRZ data pattern "101" or "010" is received. In a third embodiment, a signal is transmitted and received using a frame data including at least one NRZ data pattern "101" or "010".

FIG. 19 is a block diagram showing a structure of a wireless system and a wireless device 3 according to a third embodiment of the present invention. In the wireless system as shown in FIG. 19, a modulated signal is transmitted and received between the wireless devices 3 and 4, whereby wireless communication is performed. Note that only two wireless devices are shown in FIG. 19, but three or more wireless devices may be included.

In FIG. 19, the internal structures of the wireless devices 3 and 4 are identical to each other. Hereinafter, the internal structure of the wireless device 3 will be described as one example. The wireless device 3 includes a communication control section 31, a frame generation section 32, a Manchester encoding section 33, an ASK modulation section 34, an antenna switch (SW) 35, an antenna 36, a detection section 37, an ASK demodulation section 38, a frame processing section 39, a memory 41, a CPU 42, and an interface (I/F) section 43. The ASK demodulation section 38 has the same function as the ASK demodulation device as described in the first or second embodiment.

The communication control section 31 exchanges information with the CPU 42, the memory 41, and the interface section 43, etc., via an internal bus, obtains information data to be transmitted to the wireless device 4, and inputs the information data to the frame generation section 32. Note that the interface section 43 includes, for example, a switch operated by a-user and a display section for displaying a communication result.

Figure 20:
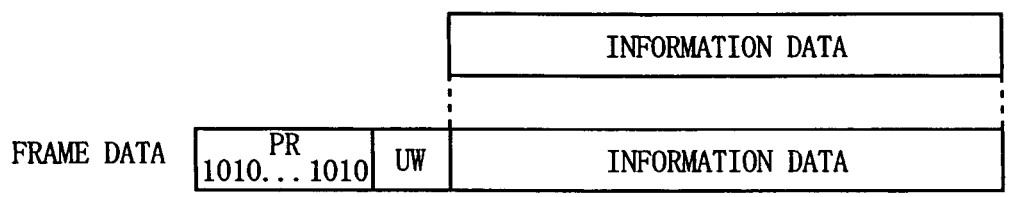
FIG. 20 is an illustration showing a data structure of information data and a data structure of frame data generated by a frame generation section 32.

The frame generation section 32 adds a header, etc., to the information data outputted from the communication control section 31, and inputs frame data, which is encoded by NRZ data and structured as a frame, to the Manchester encoding section 33. FIG. 20 is an illustration showing a data structure of information data and a data structure of frame data generated by the frame generation section 32. As shown in FIG. 20, the frame generation section 32 generates frame data by adding a preamble (PR) for bit synchronization and a unique word (UW) for frame synchronization to the head of the inputted information data. The preamble (PR) includes at least one or more "101" or "010" as an NRZ data sequence pattern.

The Manchester encoding section 33 Manchester-encodes the frame data encoded by NRZ code, and inputs the Manchester data to the ASK modulation section 34.

The ASK modulation section 34 ASK-modulates a carrier having a predetermined frequency by Manchester data outputted from the Manchester encoding section 33, and outputs an ASK-modulated signal.

The modulated signal outputted from the ASK modulation section 34 is transmitted from the antenna 36 to the wireless device 4 via the antenna switch 35.

The wireless device 4 transmits a modulated signal to the wireless device 3 in a manner similar to the wireless device 3.

The modulated signal received by the antenna 36 of the wireless device 3 is inputted to the detection section 37 via the antenna switch 35.

The detection section 37 detects the modulated signal using a method such as synchronous detection or asynchronous detection (envelope detection), and inputs the detected signal to the ASK demodulation section 38.

The ASK demodulation section 38 demodulates the ASK-modulated signal and decodes Manchester code by a method as described in the first or second embodiment, and inputs NRZ data and a data clock signal to the frame processing section 39.

The frame processing section 39 receives the NRZ data in accordance with the data clock signal, removes the header, etc., (performs processing opposite to the processing of the frame generation section 32) and inputs only information data to the communication control section 31. Specifically, the frame processing section 39 detects a data sequence having the same pattern as the unique word (UW) from the NRZ data outputted from the ASK demodulation section 38. When the data sequence having the same pattern as the unique word (UW) is detected, the frame processing section 39 inputs the NRZ data following the unique word to the communication control section 31 as information data.

The communication control section 31 performs necessary processing based on the inputted information data.

The wireless device 4 demodulates the received modulated signal in a manner similar to the wireless device 3, and obtains NRZ data and a data clock signal.

As such, according to the third embodiment, a preamble (PR) portion includes a pattern "101" or "010", whereby the wireless device can adjust the phase of a data clock signal (hereinafter referred to as clock recovery) during the reception of the preamble. Thus, the wireless device can correctly demodulate a signal following a unique word (UW).

Note that the more a pattern "101" or "010" is received, the more accurately the ASK demodulation section 38 can perform clock recovery. Thus, it is preferable that the preamble (PR) include a pattern alternating between "1" and "0" such as "1010101010 . . . ".

Note that a transmitting device for transmitting a modulated signal may be structured by the frame generation section 32, the Manchester encoding section 33, the ASK modulation section 34, the antenna switch 35, and the antenna 36 in the third embodiment.

Note that a receiving device for receiving a modulated signal may be structured by the antenna 36, the antenna switch 35, the detection section 37, the ASK demodulation section 38, and the frame processing section 39 in the third embodiment.

Fourth Embodiment

In a fourth embodiment, the structure of the wireless system and the wireless device is the same as that of the third embodiment. Therefore, FIG. 19 is used in this embodiment. In the fourth embodiment, assume that the wireless device inserts an NRZ data pattern sequence "101" or "010" into information data as well as a preamble. In the fourth embodiment, the frame generation section 32 and the frame processing section 39 operate differently from their counterparts in the third embodiment. Therefore, the operations of the above component elements will be described below.

Figure 21:
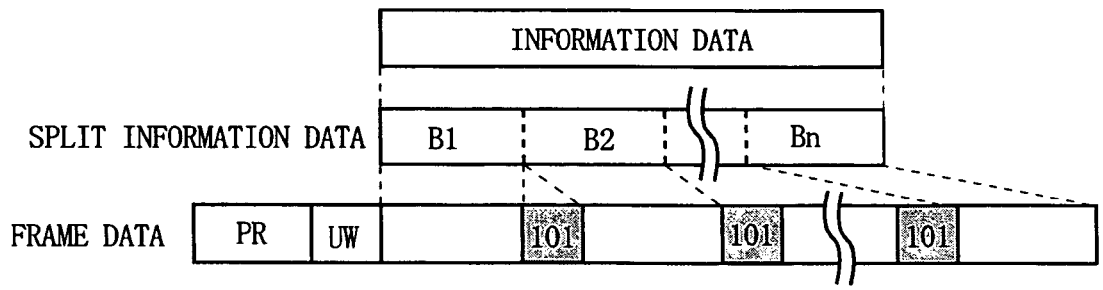
FIG. 21 is an illustration showing a data structure of information data, a data structure of the information data divided into a plurality of blocks, and a data structure of frame data.

FIG. 21 is an illustration showing a data structure of information data, a data structure of the information data divided into a plurality of blocks, and a data structure of frame data. The frame generation section 32 divides the information data inputted from the communication control section 31 into a plurality of blocks B1 to Bn. Next, the frame generation section 32 inserts at least one or more NRZ data patterns "101" or "010" between two blocks. Then, the frame generation section 32 adds a preamble (PR) including "101" or "010" and a unique word (UW) to the head of the information data, and completes generation of frame data.

The frame processing section 39 detects a unique word (UW) from the demodulated NRZ data so as to identify the head of the information data, removes the pattern "101" or "010" inserted into the information data, and inputs only the information data to the communication control section 31. The frame processing section 39 previously recognizes the size of one block, whereby the frame processing section 39 can remove the pattern "101" or "010" inserted into the information data.

Bit errors may occur in the case where there is a difference in frequency between transmitting/receiving devices. This is because a polarity determination timing is shifted with the passage of time if no clock recovery is performed after clock recovery is performed once at a preamble (PR) portion. It will be understood that the pattern "101" or "010" may be included in the information data by accident. At worst, however, the pattern "101" or "010" may not be included in the information data for a long time. Thus, in the fourth embodiment, the pattern "101"or "010" is intentionally inserted into the information data, whereby the wireless device can perform reliable clock recovery on a periodic basis during the reception of the information data even if there is a difference in frequency between the transmitting/receiving devices. As a result, it is possible to minimize the possibility that bit errors occur.

Note that, in FIG. 21, it is assumed that a three-bit pattern is inserted between blocks of the information data, but a pattern longer than three bits may be inserted therebetween. In this case, it is preferable that a pattern alternating between "1"s and "0"s such as "10101010" be inserted.

Fifth Embodiment

In a fifth embodiment, the structure of the wireless system and the wireless device is the same as that of the third embodiment. Therefore, FIG. 19 is used in this embodiment. In the fifth embodiment, assume that the wireless device inserts an NRZ data sequence having a specific pattern into information data as well as a preamble. In the fifth embodiment, the frame generation section 32 and the frame processing section 39 operate differently from their counterparts in the third embodiment. Therefore, the operations of the above component elements will be described below.

Figure 22:
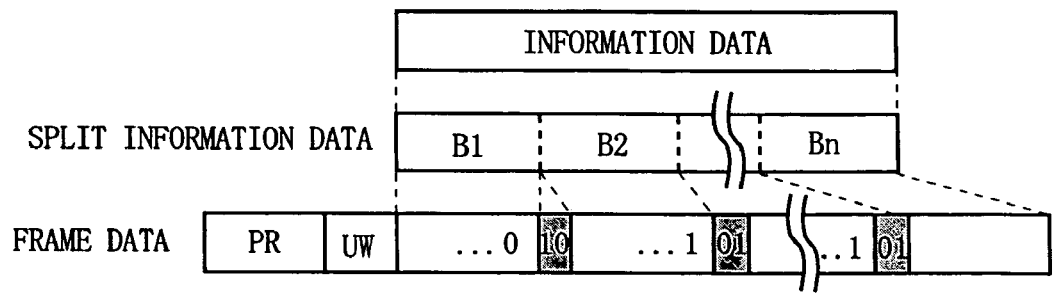
FIG. 22 is an illustration showing one example of a data structure of information data, a data structure of the information data divided into a plurality of blocks, and a data structure of frame data.
Figure 23:
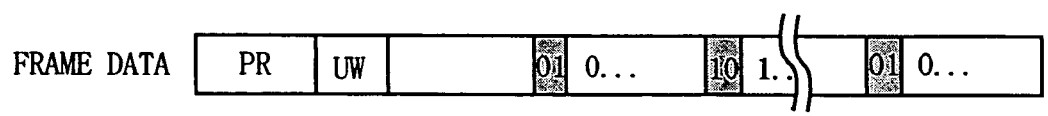
FIG. 23 is an illustration showing another example of a data structure of frame data.

FIG. 22 is an illustration showing one example of a data structure of information data, a data structure of the information data divided into a plurality of blocks, and a data structure of frame data. FIG. 23 is an illustration showing another example of a data structure of frame data.

The frame generation section 32 divides the information data inputted from the communication control section 31 into a plurality of blocks B1 to Bn. Next, the frame generation section 32 refers to the last bit of each block. When the last bit is "0", the frame generation section 32 generates frame data by inserting a pattern "10" immediately after the block. On the other hand, when the last bit is "1", the frame generation section 32 generates frame date by inserting a pattern "01" immediately after the block. Note that, as shown in FIG. 23, the frame generation section 32 may generate frame data by inserting a pattern "01" immediately before the block when the first bit of each block is "0", and generate frame data by inserting a pattern "10" immediately before the block when the first bit of each block is "1". As a result, a pattern "101" or "010" is inserted into the information data. The frame generation section 32 adds a preamble (PR) including "101" or "010" and a unique word (UW) to the head of the information data, and completes generation of frame data.

The frame processing section 39 detects a unique word (UW) from the demodulated NRZ data so as to identify the head of the information data, removes the pattern "01" or "10" inserted into the information data, and inputs only the information data to the communication control section 31. The frame processing section 39 previously recognizes the size of one block, whereby the frame processing section 39 can remove the pattern "01" or "10" inserted into the information data.

As such, according to the fifth embodiment, a pattern "01" or "10" is inserted in accordance with the last or first bit of each block. Therefore, a pattern "101" or "010" is inserted into the information data. As a result, the same effect as that of the fourth embodiment can be obtained. Furthermore, only a minimum two-bit pattern is inserted in the fifth embodiment. Thus, compared to the fourth embodiment, it is possible to reduce the number of bits to be inserted. As a result, transmission efficiency can be improved. In the fifth embodiment, if the same number of bits as the fourth embodiment are inserted, more patterns "101" and "010" can be obtained compared to the fourth embodiment. Thus, it is possible to perform more accurate clock recovery compared to the fourth embodiment.

Note that the number of bits of a pattern to be inserted may be equal to or greater than two. In this case, when the last bit of the block is "1", the frame generation section 32 inserts an NRZ data pattern beginning from "01" immediately after the block. On the other hand, when the last bit of the block is "0", the frame generation section 32 inserts an NRZ data pattern beginning from "10" immediately after the block. Alternatively, when the first bit of the block is "1", the frame generation section 32 inserts an NRZ data pattern ending with "10" immediately after the block. On the other hand, when the first bit of the block is "0", the frame generation section 32 inserts an NRZ data pattern ending with "01" immediately after the block. It is preferable that a pattern to be inserted alternate between "1"s and "0"s.

Sixth Embodiment

Figure 24:
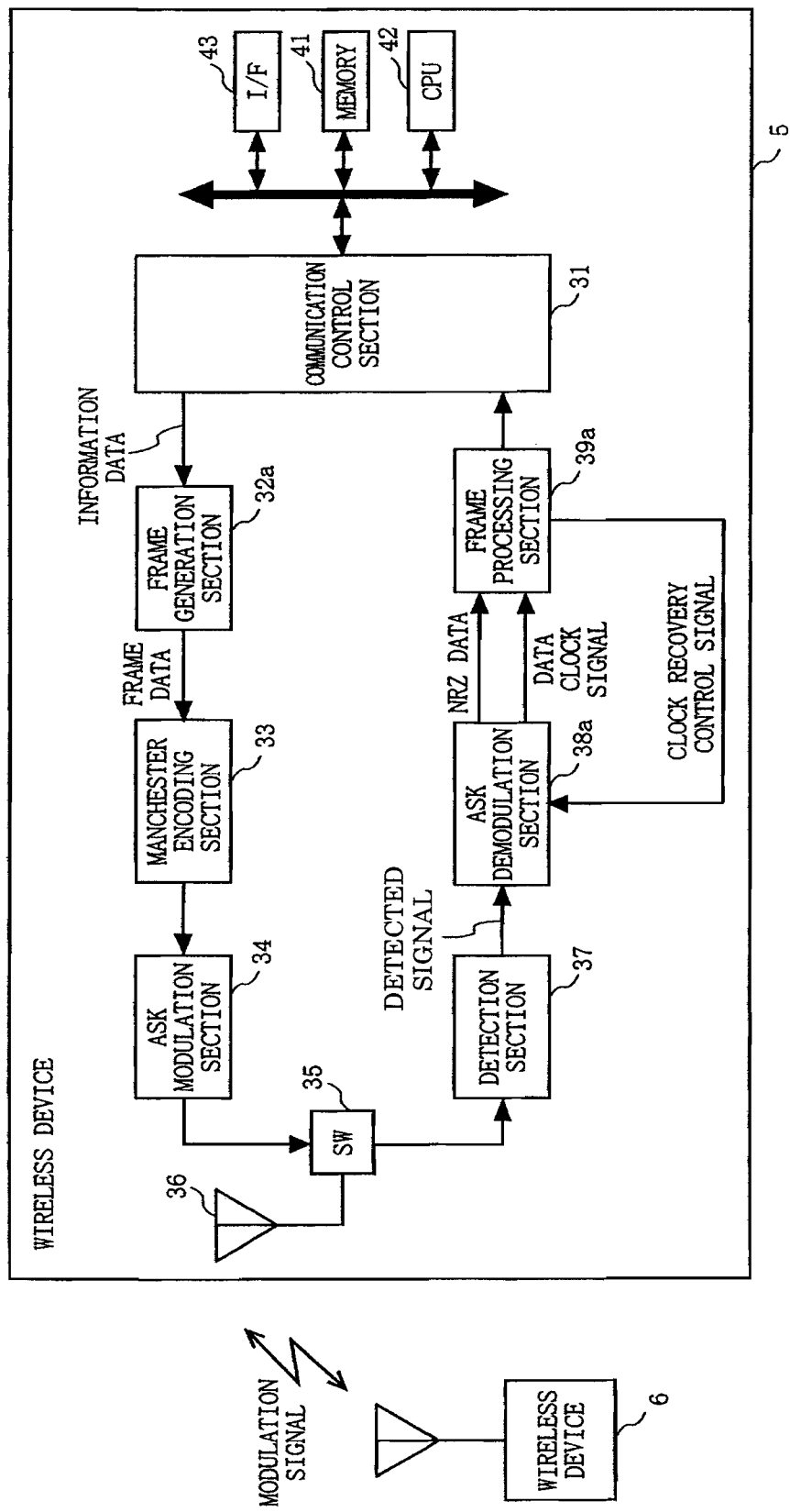
FIG. 24 is an illustration showing a structure of a wireless system and a wireless device 5 according to a sixth embodiment of the present invention.

FIG. 24 is an illustration showing a structure of a wireless system and a wireless device 5 according to a sixth embodiment of the present invention. In the wireless system as shown in FIG. 24, a modulated signal is transmitted and received between the wireless devices 5 and 6, whereby wireless communication is performed. Note that only two wireless devices are shown in FIG. 24, but three or more wireless devices may be included. In FIG. 24, any component elements function similarly to their counter parts in FIG. 19 will be denoted by the same reference numerals as those used therein, and the description thereof is omitted.

In FIG. 24, the wireless device 5 includes the communication control section 31, a frame generation section 32a, the Manchester encoding section 33, the ASK modulation section 34, the antenna switch (SW) 35, and the antenna 36, the detection section 37, an ASK demodulation section 38a, a frame processing section 39a, the memory 41, the CPU 42, and the interface (I/F) section 43. The ASK demodulation section 38a performs similarly to the ASK demodulation device as described in the first or second embodiment in accordance with a clock recovery control signal outputted from the frame processing section 39a.

Figure 25:
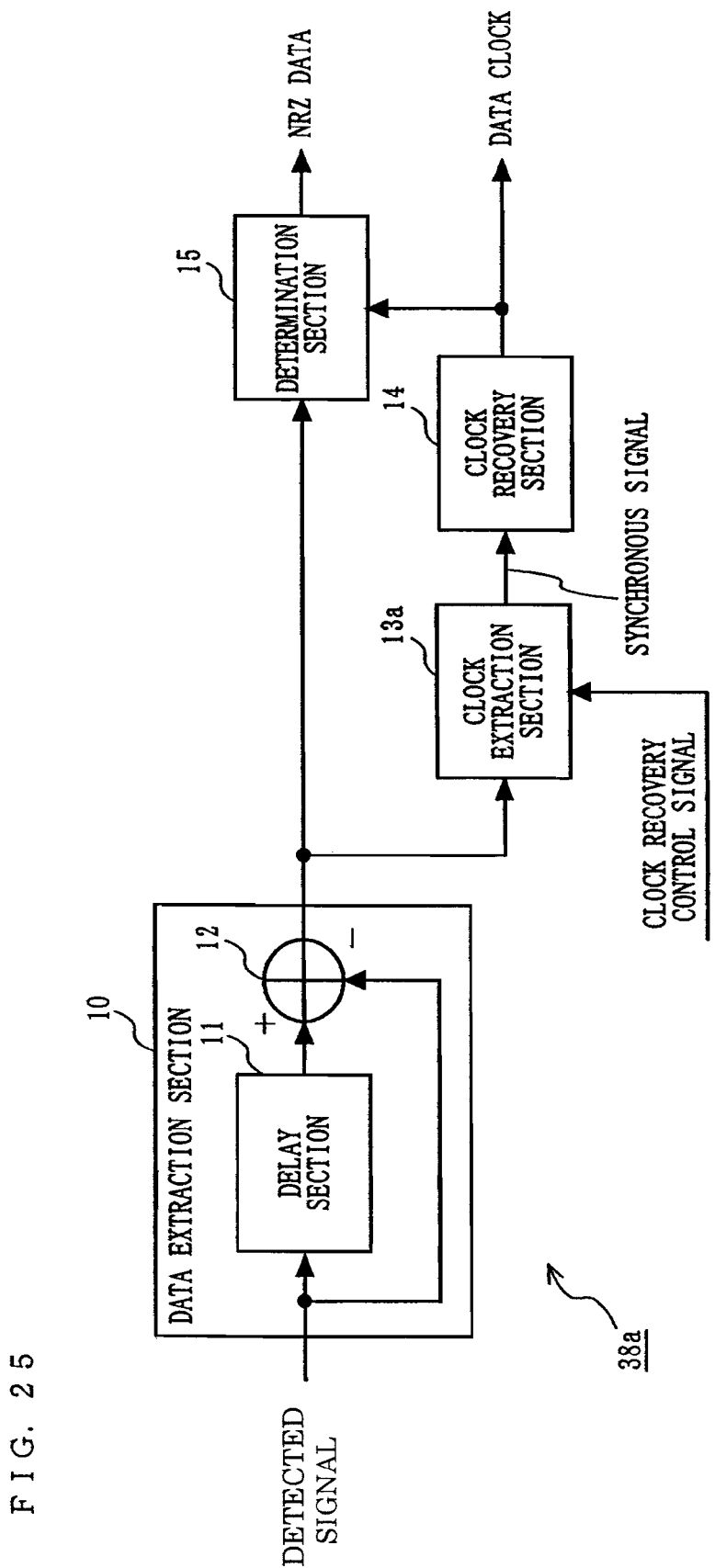

FIG. 25 is a block diagram showing a structure of the ASK demodulation section 38a. As shown in FIG. 25, the ASK demodulation section 38a in the sixth embodiment differs from its counterpart in the first embodiment only in that a clock recovery control signal is inputted to a clock extraction section 13a. Note that, as is the case with the second embodiment, an integration filter may be provided to the ASK demodulation section 38a.

As is the case with the frame generation section described in the third, fourth, or fifth embodiment, the frame generation section 32a generates frame data so that a pattern "010" or "101" is included in the preamble and/or information data.

The frame processing section 39a inputs a clock recovery control signal indicating whether or not clock recovery is performed to the clock extraction section 13a in the ASK demodulation section 38a. The clock recovery control signal may have two patterns. In the present embodiment, assume that a clock recovery control signal having one of these two patterns is used.

Figure 26:
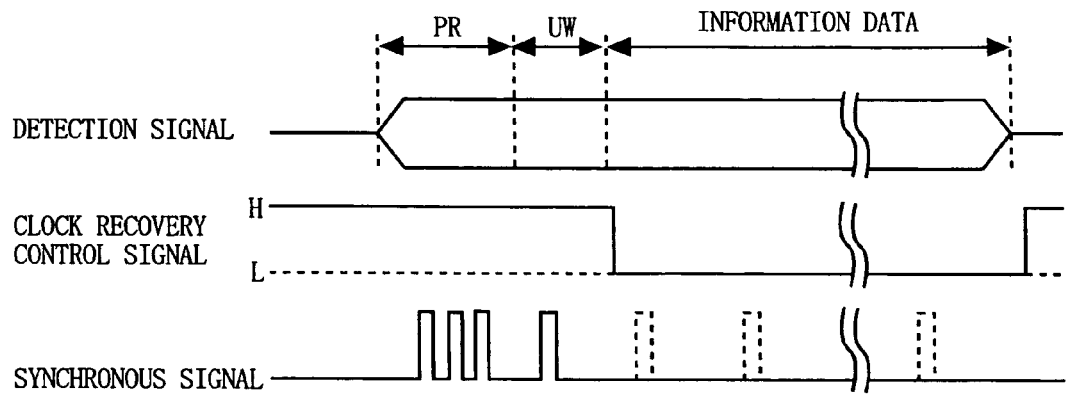
FIG. 26 is an illustration showing a relationship among a first pattern clock recovery control signal, a detected signal, and a synchronous signal.
Figure 27:
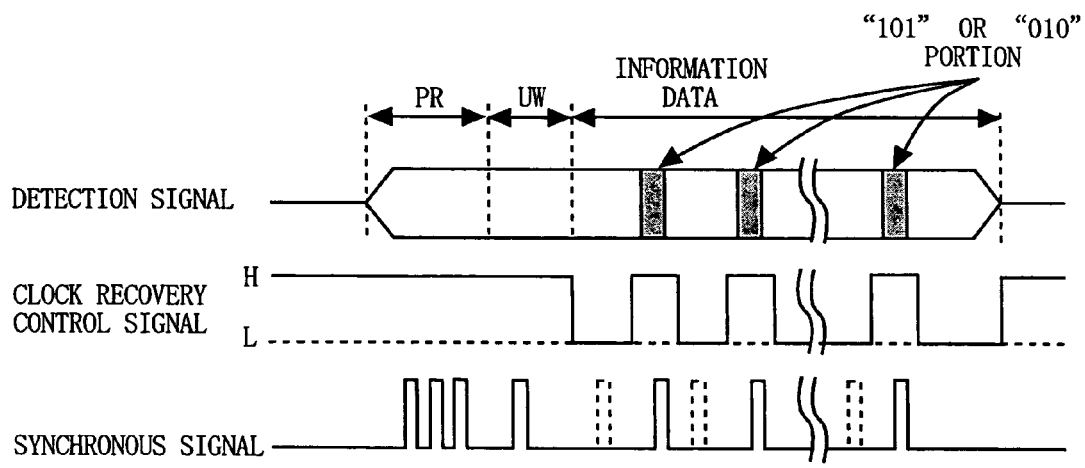
FIG. 27 is an illustration showing a relationship among a second pattern clock recovery control signal, a detected signal, and a synchronous signal.
Figure 28:
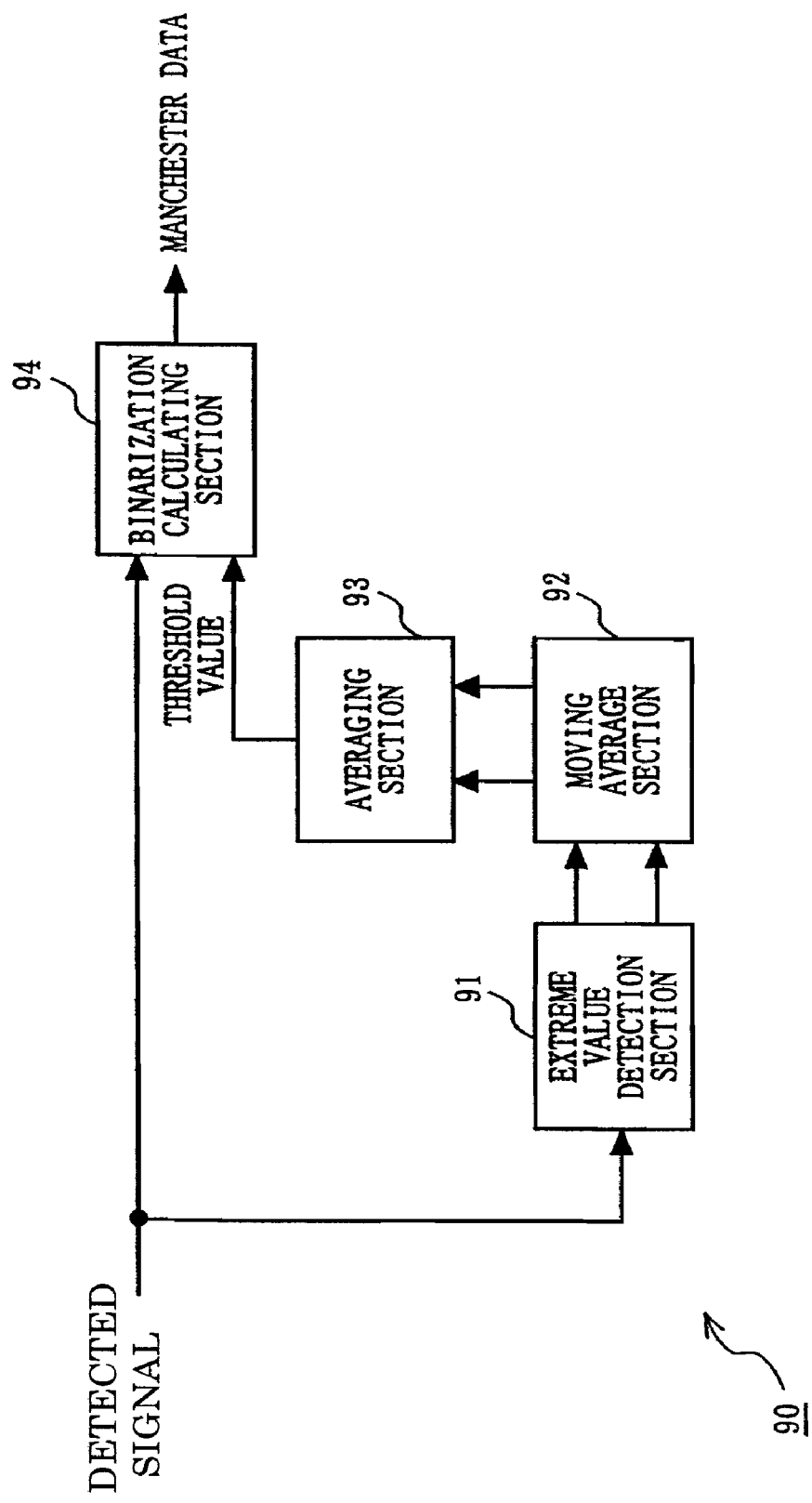
FIG. 28 is a block diagram showing a structure of a conventional ASK demodulation device 90 disclosed in patent document 1.
Figure 29A:
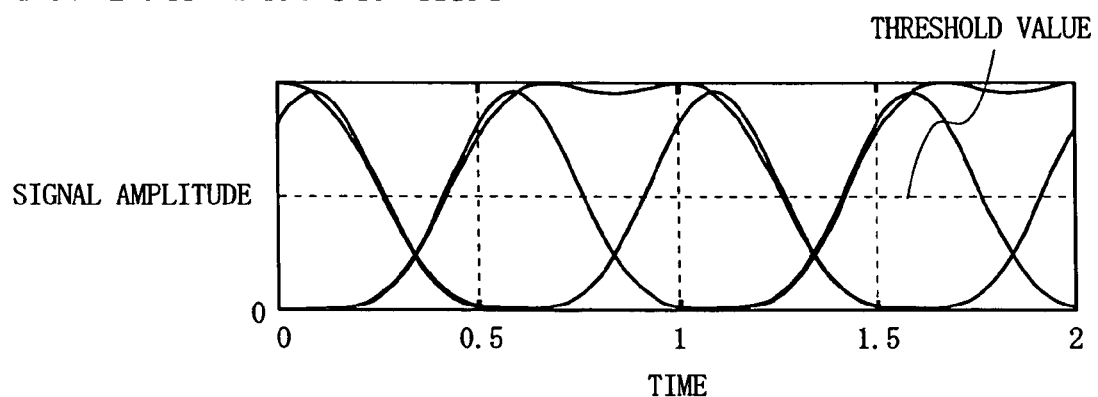
FIG. 29A is an illustration showing an eye pattern of a detected signal in the conventional ASK demodulation device 90 as shown in FIG. 28.
Figure 29B:
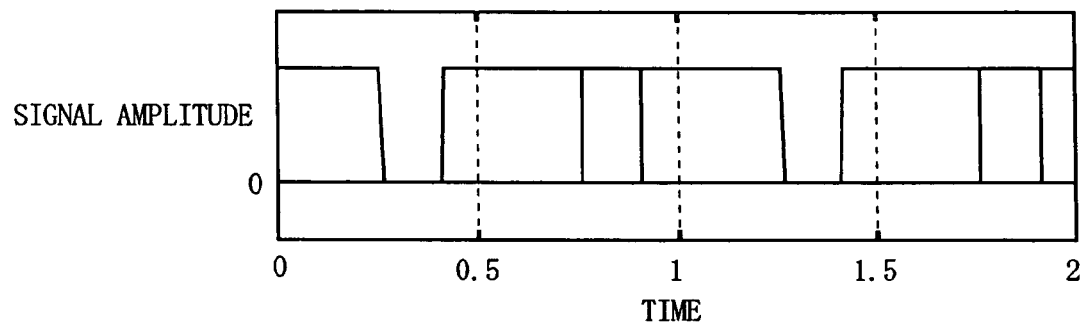
FIG. 29B is an illustration showing an eye pattern of Manchester data in the conventional ASK demodulation device 90 as shown in FIG. 28.
Figure 29C:
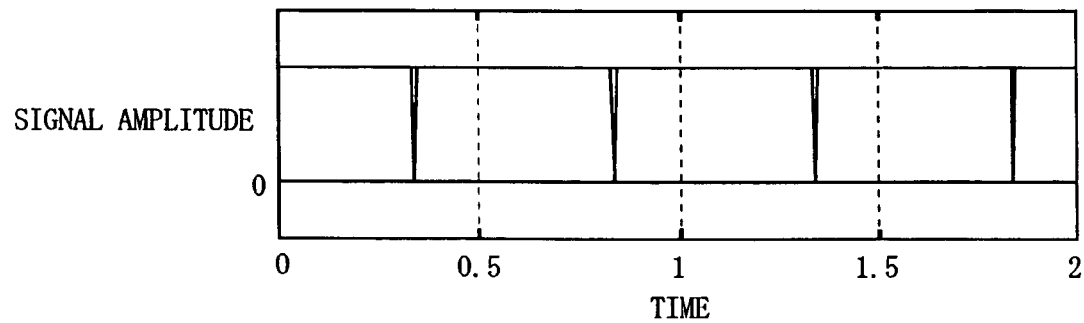
FIG. 29C is an illustration showing an eye pattern of Manchester data with 50% duty ratio.

FIG. 26 is an illustration showing a relationship among a first pattern clock recovery control signal, a detected signal, and a synchronous signal. FIG. 27 is an illustration showing a relationship among a second pattern clock recovery control signal, a detected signal, and a synchronous signal. FIGS. 26 and 27 indicate that clock recovery should be performed when the clock recovery control signal is at H level, and that clock recovery is not performed when the clock recovery control signal is at L level.

As shown in FIG. 26, in the case where the first pattern clock recovery control signal is used, the frame processing section 39a sets the clock recovery control signal to H level immediately after a detected signal is received, causes the clock extraction section 13a to detect whether or not the zero-crossing time interval is Tb and output a synchronous signal, and causes the clock recovery section 14 to perform clock recovery. When a unique word is detected, the frame processing section 39a sets the clock recovery control signal to L level, and causes the clock extraction section 13a to stop detection so as to prevent the clock recovery section 14 from performing clock recovery. As such, in the case where the first pattern clock recovery control signal is used, clock recovery is performed using only a preamble.

As shown in FIG. 27, in the case where the second pattern clock recovery signal is used, the frame processing section 39a sets the clock recovery control signal to H level immediately after a detected signal is received, causes the clock extraction section 13a to detect whether or not the zero-crossing time interval is Tb and output a synchronous signal, and causes the clock recovery section 14 to perform clock recovery. When a unique word is detected, the frame processing section 39a sets the clock recovery control signal to L level, and causes the clock extraction section 13a to stop detection so as to prevent the clock recovery section 14 from performing clock recovery. The frame processing section 39a previously recognizes the size of each block. Thus, the frame processing section 39a sets the clock recovery control signal to H level, causes the clock extraction section 13a to detect whether or not the zero-crossing time interval is Tb and output a synchronous signal, and causes the clock recovery section 14 to perform clock recovery so that an interval in which the boundary between blocks appears (an interval in which "101" or "010" appears) is at least included. As such, in the case where the second pattern clock recovery signal is used, clock recovery is performed only when a pattern "101" or "010" inserted in the preamble and information data is received.

In the case where the clock recovery control signal is at H level, the clock extraction section 13a detects whether or not the zero-crossing time interval is Tb, and outputs a synchronous signal based on the detection result. On the other hand, in the case where the clock recovery control signal is at L level, the clock extraction section 13a keeps the synchronous signal at L level. The phase of the data clock signal outputted from the clock recovery section 14 is kept at a constant level while the synchronous signal is at L level, whereby a determination timing at the determination section 15 is not shifted. As such, the ASK demodulation section 38a performs clock recovery only when an intentionally transmitted pattern "101" or "010" is received.

In the ASK demodulation devices 1 and 2 according to the first and second embodiments, the clock extraction section 13 detects that the zero-crossing time interval is Tb, and clock recovery is performed. In practice, however, the received signal waveform is affected by noise, and the zero-crossing time interval may become Tb by accident while a pattern other than "101" and "010" is received. If clock recovery is performed while the pattern other than "101" and "010" is received, bit errors may occur due to a shifted polarity determination timing.

Thus, in the sixth embodiment, clock recovery is performed only when an intentionally inserted pattern "101" or "010" is received so as to prevent clock recovery from being accidentally performed while the pattern other than "101" or "010" is received. As a result, it is possible to minimize the number of bit errors.

Note that, in the sixth embodiment, the clock extraction section 13a determines whether or not to detect that a zero-crossing time interval is Tb based on a clock recovery control signal outputted from the frame processing section 39a. Alternatively, the clock extraction section 13a may independently recognize an interval in which a pattern "101" or "010" is received, and detect that the zero-crossing time interval is Tb only during the above interval.

Note that the foregoing wireless communication system and frame data format are illustrative only and not restrictive.

Note that the ASK demodulation section, the frame generation section, the frame processing section, the Manchester encoding section, the ASK modulation section, the antenna switch, and the antenna, etc., are typically realized as an LSI (large-scale integration). The above functional blocks may be separately constructed in chip form, or may be constructed in chip form so that a portion or the entire portion thereof is included. By constructing the above functional blocks in chip form so that the entire portion thereof is included, it is possible to apply the present invention to RFID (Radio Frequency IDentification) technology employed as an IC card and a wireless tag by which wireless communication between a small wireless chip and a reader/writer is performed, for example. The above LSI may be referred to as an IC, a system LSI, a super LSI, or an ultra LSI, etc., depending on a degree of integration. Also, a method of integration is not limited to LSI, and may be realized by a dedicated circuit or a general purpose processor. Also, an FPGA (Field Programmable Gate Array), which is an LSI that can be programmed after manufacture, or a reconfigurable processor enabling connections and settings of the circuit cells in the LSI to be reconfigured may be used. Further, in the case where another integration technology replacing LSI becomes available due to improvement of a semiconductor technology or due to the emergence of another technology derived therefrom, integration of the functional blocks may be performed using the above new integration technology. For example, biotechnology may be applied to the above-described integration.

The ASK demodulation device according to the present invention can demodulate a modulated signal which is ASK-modulated with a Manchester-encoded data sequence without the need for threshold calculation and control for binarization of a detected signal. Thus, it is possible to usefully apply the ASK demodulation device according to the present invention to the communications field, etc.

While the invention has been described in detail, the foregoing description is in all aspects illustrative and not restrictive. It is understood that numerous other modifications and variations can be devised without departing from the scope of the invention.

What is claimed is:

1. An ASK demodulation device for demodulating a modulated signal which is ASK (Amplitude Shift Keying)-modulated with a data sequence obtained by Manchester-encoding NRZ (Non-Return to Zero) data, the ASK demodulation device comprising:

a delay section for delaying a detected signal obtained from the modulated signal by less than one bit time in the NRZ data, and outputting a resultant signal as a delayed signal;

a subtraction section for performing subtraction between the delayed signal outputted from said delay section and the detected signal, and outputting a resultant signal as a subtracted signal;

a clock extraction section for extracting, from crossing points at which the subtracted signal outputted from said subtraction section and a threshold value cross each other, crossing points whose time interval is more than or equal to (Tb−α) and less than or equal to (Tb+β) (wherein $0<\alpha \leq Tb/8$, $0<\beta \leq Tb$: Tb is one bit time in the NRZ data), and outputting a synchronous signal synchronized with the extracted crossing point;

a clock recovery section for synchronizing a clock signal having a same rate as a bit rate of the NRZ data to a phase of the synchronous signal outputted from said clock extraction section, and outputting a data clock signal; and a determination section for determining a polarity of the subtracted signal outputted from said subtraction section in accordance with the data clock signal outputted from said clock recovery section, and outputting a determination result as the NRZ data.

2. The ASK demodulation device according to claim 1, wherein said delay section delays the detected signal by more than or equal to 3/24 bit time and less than or equal to 0.5 bit time, and outputs a resultant signal as the delayed signal.

3. The ASK demodulation device according to claim 1, wherein said delay section delays the detected signal by more than or equal to 0.5 bit time and less than or equal to $^{21}/_{24}$ bit time, and outputs a resultant signal as the delayed signal.

4. The ASK demodulation device according to claim 1, wherein said delay section delays the detected signal by 0.5 bit time, and outputs a resultant signal as the delayed signal.

5. The ASK demodulation device according to claim 1, wherein said clock extraction section extracts, from the crossing points of the subtracted signal outputted from said subtraction section, crossing points whose time interval is Tb, and outputs a synchronous signal synchronized with the extracted crossing point.

6. The ASK demodulation device according to claim 1, further comprising a low-pass filter connected to an input or output of a data extraction section, which includes said delay section and is connected to said subtraction section, to remove a high frequency component included in an input signal.

7. The ASK demodulation device according to claim 6, wherein said low-pass filter is an integration filter for integrating the input signal for a predetermined time period.

8. The ASK demodulation device according to claim 7, wherein an integration period of the integration filter is less than one bit time.

9. The ASK demodulation device according to claim 7, wherein an integration period of the integration filter is 0.5 bit time.

10. A wireless device for transmitting and receiving a modulated signal which is ASK (Amplitude Shift Keying)-modulated with a data sequence obtained by Manchester-encoding NRZ (Non-Return to Zero) data, the wireless device comprising:
a frame generation section for generating frame data by structuring information data to be transmitted, which is NRZ data, as a frame;
a Manchester encoding section for Manchester-encoding said frame data generated by said frame generation section, and outputting resultant data as Manchester data;
an ASK modulation section for ASK-modulating a carrier by the Manchester data outputted from said Manchester encoding section, and outputting the modulated signal;
a detection section for detecting a modulated signal transmitted from another wireless device, and outputting a detected signal;
an ASK demodulation section for demodulating the detected signal outputted from said detection section, and outputting the NRZ data and a data clock signal; and
a frame processing section for extracting the information data based on the NRZ data and the data clock signal outputted from said ASK demodulation section, and outputting the information data,
wherein said frame generation section generates the frame data so that at least one or more NRZ data patterns "101" or "010" are included therein, and
wherein the ASK demodulation section includes:
a delay section for delaying the detected signal outputted from said detection section by less than one bit time in the NRZ data, and outputting a resultant signal as a delayed signal;
a subtraction section for performing subtraction between the delayed signal outputted from said delay section and the detected signal, and outputting a resultant signal as a subtracted signal;
a clock extraction section for extracting, from crossing points at which the subtracted signal outputted from said subtraction section and a threshold value cross each other, crossing points whose time interval is more than or equal to (Tb−α) and less than or equal to (Tb+β) (wherein $0<\alpha\leqq Tb/8$, $0<\beta\leqq Tb$: Tb is one bit time in the NRZ data), and outputting a synchronous signal synchronized with the extracted crossing point;
a clock recovery section for synchronizing a clock signal having a same rate as a bit rate of the NRZ data to a phase of the synchronous signal outputted from said clock extraction section, and outputting the data clock signal; and
a determination section for determining a polarity of the subtracted signal outputted from said subtraction section in accordance with the data clock signal outputted from the clock recovery section, and outputting a determination result as the NRZ data.

11. The wireless device according to claim 10, wherein said frame generation section generates the frame data so that at least one or more NRZ data patterns of "101" or "010" are included in a head of the frame data.

12. The wireless device according to claim 10, wherein said frame generation section divides the information data into a plurality of blocks, and generates the frame data so that at least one or more NRZ data patterns of "101" or "010" are included between adjacent blocks of the plurality of blocks.

13. The wireless device according to claim 10, wherein said frame generation section divides the information data into a plurality of blocks,
when a last bit of the block is "1", inserts an NRZ data pattern beginning from "01" immediately after the block in order to generate the frame data, and
when a last bit of the block is "0", inserts an NRZ data pattern beginning from "10" immediately after the block in order to generate the frame data.

14. The wireless device according to claim 10, wherein said frame generation section divides the information data into a plurality of blocks,
when a first bit of the block is "1", inserts an NRZ data pattern ending with "10" immediately before the block in order to generate the frame data, and
when a first bit of the block is "0", inserts an NRZ data pattern ending with "01" immediately before the block in order to generate the frame data.

15. The wireless device according to claim 10, wherein the clock extraction section extracts the crossing points only when a pattern of "101" or "010" previously inserted into the frame data is received.

16. A receiving device for receiving a modulated signal which is ASK (Amplitude Shift Keying)-modulated with a data sequence obtained by Manchester-encoding NRZ (Non-Return to Zero) data including at least one or more patterns of "101" or "010", the receiving device comprising:
a detection section for detecting the modulated signal transmitted from another wireless device, and outputting a detected signal;
an ASK demodulation section for demodulating the detected signal outputted from said detection section, and outputting NRZ data and a data clock signal; and
a frame processing section for extracting information data based on the NRZ data and the data clock signal outputted from said ASK demodulation section, and outputting the information data,
wherein the ASK demodulation section includes:
a delay section for delaying the detected signal outputted from said detection section by less than one bit time in the NRZ data, and outputting a resultant signal as a delayed signal;
a subtraction section for performing subtraction between the delayed signal outputted from said delay section and the detected signal, and outputting a resultant signal as a subtracted signal;

a clock extraction section for extracting, from crossing points at which the subtracted signal outputted from said subtraction section and a threshold value cross each other, crossing points whose time interval is more than or equal to (Tb−α) and less than or equal to (Tb+β) (wherein $0<\alpha \leq Tb/8$, $0<\beta \leq Tb$: Tb is one bit time in the NRZ data), and outputting a synchronous signal synchronized with the extracted crossing point;

a clock recovery section for synchronizing a clock signal having a same rate as a bit rate of the NRZ data to a phase of the synchronous signal outputted from said clock extraction section, and outputting the data clock signal; and a determination section for determining a polarity of the subtracted signal outputted from said subtraction section in accordance with the data clock signal outputted from the clock recovery section, and outputting a determination result as the NRZ data.

17. An integrated circuit for demodulating a modulated signal which is ASK (Amplitude Shift Keying)-modulated with a data sequence obtained by Manchester-encoding NRZ (Non-Return to Zero) data, the integrated circuit comprising:

a delay section for delaying a detected signal obtained by detecting the modulated signal by less than one bit time in NRZ data, and outputting a resultant signal as a delayed signal;

a subtraction section for performing subtraction between the delayed signal outputted from said delay section and the detected signal, and outputting a resultant signal as a subtracted signal;

a clock extraction section for extracting, from crossing points at which the subtracted signal outputted from said subtraction section and a threshold value cross each other, crossing points whose time interval is more than or equal to (Tb−α) and less than or equal to (Tb+β) (wherein $0<\alpha \leq Tb/8$, $0<\beta \leq Tb$: Tb is one bit time in the NRZ data), and outputting a synchronous signal synchronized with the extracted crossing point;

a clock recovery section for synchronizing a clock signal having a same rate as a bit rate of the NRZ data to a phase of the synchronous signal outputted from said clock extraction section, and outputting a data clock signal; and a determination section for determining a polarity of the subtracted signal outputted from said subtraction section in accordance with the data clock signal outputted from said clock recovery section, and outputting a determination result as the NRZ data.

18. An integrated circuit for transmitting and receiving a modulated signal which is ASK (Amplitude Shift Keying)-modulated with a data sequence obtained by Manchester-encoding NRZ (Non-Return to Zero) data, the integrated circuit comprising:

a frame generation section for generating frame data by structuring information data to be transmitted, which is NRZ data, as a frame;

a Manchester encoding section for Manchester-encoding the frame data generated by said frame generation section, and outputting resultant data as Manchester data;

an ASK modulation section for ASK-modulating a carrier by the Manchester data outputted from said Manchester encoding section, and outputting a modulated signal;

a detection section for detecting a modulated signal transmitted from another wireless device, and outputting a detected signal;

an ASK demodulation section for demodulating the detected signal outputted from said detection section, and outputting NRZ data and a data clock signal; and a frame processing section for extracting the information data based on the NRZ data and the data clock signal outputted from said ASK demodulation section, and outputting the information data, wherein the frame generation section generates the frame data so that at least one or more NRZ data patterns "101" or "010" are included therein, and wherein the ASK demodulation section includes:

a delay section for delaying the detected signal outputted from said detection section by less than one bit time in the NRZ data, and outputting a resultant signal as a delayed signal;

a subtraction section for performing subtraction between the delayed signal outputted from said delay section and the detected signal, and outputting a resultant signal as a subtracted signal;

a clock extraction section for extracting, from crossing points at which the subtracted signal outputted from said subtraction section and a threshold value cross each other, crossing points whose time interval is more than or equal to (Tb−α) and less than or equal to (Tb+β) (wherein $0<\alpha \leq Tb/8$, $0<\beta \leq Tb$: Tb is one bit time in the NRZ data), and outputting a synchronous signal synchronized with the extracted crossing point;

a clock recovery section for synchronizing a clock signal having a same rate as a bit rate of the NRZ data to a phase of the synchronous signal outputted from said clock extraction section, and outputting a data clock signal; and a determination section for determining a polarity of the subtracted signal outputted from said subtraction section in accordance with the data clock signal outputted from the clock recovery section, and outputting a determination result as the NRZ data.

* * * * *